United States Patent [19]
Drucker et al.

[11] Patent Number: 5,883,801
[45] Date of Patent: Mar. 16, 1999

[54] METHOD AND APPARATUS FOR MANAGING ELECTROMAGNETIC RADIATION USAGE

[75] Inventors: Steven Jay Drucker, Atlanta; David Raynault, Doraville; Victor Murphy, Columbus, all of Ga.

[73] Assignee: Microwave Science, LLC, Norcross, Ga.

[21] Appl. No.: 840,526

[22] Filed: Apr. 21, 1997

Related U.S. Application Data

[63] Continuation-in-part of Ser. No. 647,568, May 14, 1996, Pat. No. 5,812,393.

[51] Int. Cl.$^6$ .................................................. G05B 11/01
[52] U.S. Cl. .......................... 364/144; 364/142; 364/143; 364/477.05; 219/702; 219/720
[58] Field of Search ..................... 364/142, 143, 364/144, 147, 146, 477.02, 477.04, 477.05; 219/703, 710, 719, 702, 720; 126/299; 395/651, 652, 567

[56] References Cited

U.S. PATENT DOCUMENTS

| | | | |
|---|---|---|---|
| 4,211,911 | 7/1980 | Dehn | 219/10.55 F |
| 4,271,479 | 6/1981 | Cheselka et al. | 364/900 |
| 4,309,584 | 1/1982 | Terakami | 219/10.55 B |
| 4,317,976 | 3/1982 | Noda | 219/10.55 F |
| 4,323,773 | 4/1982 | Carpenter | 235/473 |
| 4,339,646 | 7/1982 | Doi et al. | 219/10.55 B |
| 4,340,797 | 7/1982 | Takano et al. | 219/10.55 B |
| 4,345,132 | 8/1982 | Takase et al. | 219/10.55 B |
| 4,356,370 | 10/1982 | Horinouchi | 219/10.55 B |
| 4,375,586 | 3/1983 | Ueda | 219/10.55 B |
| 4,413,168 | 11/1983 | Teich | 219/10.55 B |
| 4,420,668 | 12/1983 | Larson et al. | 219/10.55 B |
| 4,447,693 | 5/1984 | Buck | 219/10.55 M |
| 4,510,594 | 4/1985 | Johnson, Jr. | 370/15 |
| 4,517,429 | 5/1985 | Horinouchi | 219/10.55 B |
| 4,568,810 | 2/1986 | Carmean | 219/10.55 B |
| 4,629,848 | 12/1986 | Yokozeki et al. | 219/10.55 B |
| 4,642,755 | 2/1987 | Hinch | 364/200 |
| 4,697,057 | 9/1987 | Fowler | 219/10.55 B |
| 4,780,588 | 10/1988 | Edamura | 219/10.55 B |
| 4,812,606 | 3/1989 | Eke | 219/10.55 B |
| 4,816,635 | 3/1989 | Edamura | 219/10.55 B |
| 4,837,414 | 6/1989 | Edamura | 219/10.55 B |
| 4,933,527 | 6/1990 | Edamura | 219/10.55 B |
| 4,968,864 | 11/1990 | Doi et al. | 219/10.55 B |
| 4,972,060 | 11/1990 | Edamura | 219/10.55 B |
| 5,067,072 | 11/1991 | Talati et al. | 395/650 |
| 5,088,031 | 2/1992 | Takasaki et al. | 395/400 |
| 5,136,711 | 8/1992 | Hugard et al. | 395/700 |
| 5,147,068 | 9/1992 | Wright | 221/9 |
| 5,171,948 | 12/1992 | Ishii | 219/10.55 B |

(List continued on next page.)

FOREIGN PATENT DOCUMENTS 0 043958  1/1983  European Pat. Off. ........ G01R 21/00

*Primary Examiner*—Reba I. Elmore
*Assistant Examiner*—Ramesh Patel
*Attorney, Agent, or Firm*—Bernstein & Associates, P.C.

[57] ABSTRACT

The present invention provides an interpretive BIOS machine for controlling the cooking of food in a microwave oven or the conduct of a physical, chemical, or thermodynamic process stream wherein the microwave oven or process stream functionally operates by user independent commands. The interpretive BIOS machine is implemented by a microprocessor or computer having a memory for the storing of a program that contains the operating instruction for the present invention. Data is received into the interpretive BIOS machine from a data entry mechanism. That data is specific code that represents a plurality of desired cooking or process instructions selected by the user of the microwave oven or process stream. The present invention interprets the received data and transforms that data into time duration(s) and scaled power level(s) settings for the microwave oven or process stream. The present invention monitors and adjusts the work performed on a specimen disposed within the microwave oven or process stream.

15 Claims, 17 Drawing Sheets

U.S. PATENT DOCUMENTS

| | | | |
|---|---|---|---|
| 5,221,817 | 6/1993 | Ota | 219/10.55 B |
| 5,272,300 | 12/1993 | Edamura | 219/10.55 B |
| 5,274,209 | 12/1993 | Edamura | 219/10.55 B |
| 5,291,608 | 3/1994 | Flurry | 395/725 |
| 5,321,232 | 6/1994 | Ogle | 219/506 |
| 5,345,067 | 9/1994 | Ohata et al. | 219/720 |
| 5,349,344 | 9/1994 | Head | 340/825.23 |
| 5,365,606 | 11/1994 | Brocker et al. | 395/650 |
| 5,367,680 | 11/1994 | Flurry et al. | 395/650 |
| 5,408,526 | 4/1995 | McFarland et al. | 379/202 |
| 5,426,280 | 6/1995 | Smith | 219/506 |
| 5,438,663 | 8/1995 | Matsumoto et al. | 395/162 |
| 5,454,110 | 9/1995 | Kannan et al. | 395/700 |
| 5,455,958 | 10/1995 | Flurry et al. | 395/800 |
| 5,648,038 | 7/1997 | Fathi et al. | 264/406 |
| 5,676,873 | 10/1997 | Takase et al. | 219/761 |
| 5,726,424 | 3/1998 | Koether | 219/414 |

FIG.15

TRUE COOK PLUS+(TM) CODE DESIGNER ALPHA 1

COOK PROFILES: B: HIGH NONE(SMALL FROZEN FOOD)

| COMPANY | YOUR COMPANY NAME |
|---|---|
| LOCATION | YOUR LOCATION |
| USER | DAVE |
| DATE | APRIL 17, 1997 |

PRODUCT NAME: ACTION COOK POCKET
PRODUCT SKU: 123456789
TYPE: ENTREE–SINGLE COMPONENT
WEIGHT: < 6 L OZ
PACKAGE SHAPE: RCT.–HEIGHT LESS THAN 1-1/4
PACKAGE ACTIVITY: PASSIVE

PACKAGE FOOTPRINT:
LENGTH: 3  WIDTH: 3  DEPTH: 1  DIAMETER: 0

ENTER COOKING TIMES
POWER   (H)(H):HH
HIGH    ####
NONE    30:45

RESULTS: 401

GENERATE
SAVE
PRINT
CLEAR ALL
HELP
QUIT

METHOD AND APPARATUS FOR MANAGING ELECTROMAGNETIC RADIATION USAGE

CROSS-REFERENCE TO RELATED APPLICATION

This application is a continuation-in-part of application Ser. No. 08/647,568, filed May 14, 1996 now U.S. Pat. No. 5,812,393.

FIELD OF THE INVENTION

The invention relates generally to a system for physical or chemical process control. In particular, the invention is directed to an interpretive BIOS machine for controlling a chemical or physical process such as heating an object or objects, i.e. food, within a microwave oven. The invention is particularly directed to an interpretive BIOS machine for interpreting a plurality of data and using that data to control the course and sequence of a physical, chemical, or thermodynamic process stream, such as the heating of articles or food items performed within a microwave oven. The invention is more particularly directed to a work manager that controls the work performed on a specimen disposed within the confines of a microwave oven.

BACKGROUND OF THE INVENTION

A microwave oven cooks food by bombarding the food with electromagnetic waves which cause molecules in the food to vibrate billions of times per second. Heat is created when dipolar molecules (such as water) vibrate back and forth aligning themselves with the electric field or when the ions migrate in response to the electric field.

The vibrations cause heat by friction, although only at a depth of about 1 to 1.5 inches. Heat transfer properties of food continue the process of cooking by transmitting heat to areas of the cooking food that are relatively cool in comparison to the areas that have been heated by the electromagnetic waves.

Convenience of the microwave oven and reduced preparation time are key factors in the success of the microwave oven. Taste and quality of the food after being cooked in the microwave oven were at times lacking with early models because of inconsistent voltage management, inaccurately controlled magnetron tubes, and imperfect software control. Convenience was also lacking because as the demand for microwavable food increased so did the complexity of instructions for cooking that food. Imprecision of cooking instructions was fostered by among other factors the differing user interfaces and operational characteristics of dissimilar and similar sized microwave ovens and allied microwave oven operational control and user interface disparities. Consumers want the convenience of microwave cooking but do not want to constantly refer back to a package to enter and re-enter multistep instructions into a microwave oven to obtain cooked food, and still, after all their efforts receive sub-standard cooking results due to microwave oven operational and performance variances.

Because of more active lifestyles and less time spent in the kitchen, consumer demand for microwavable products is increasing along with the demand for a microwave oven that does not require a plurality of instructions to cook food, or different instructions for the same food item for different size and/or manufactured microwave ovens. Complicating the issue of product demand and usable microwave ovens is the wide variance in magnetron output power, performance variances, and user control interfaces now prevalent in the available universe of microwave ovens. A food product that may cook very well in a 1200 watt oven may take three times as long in an oven which can only provide 600 watts of power. Moreover, the user interface from microwave ovens of one manufacturer to another is often markedly different and non-intuitive.

Further complicating the issue of the wide variation in magnetron tube output power is the local utility (power company) that supplies power to the microwave oven of the user. Utility companies are often unable to balance adequately user demand for power with available power generation capability. The effect of power fluctuations on a microwave oven are numerous. In particular, the suggested cooking instructions for a particular food becomes meaningless. An example of this would be a power fluctuation of 6% by the public utility or power generation source for a brief period. The results of the degradation of power supplied to the microwave oven will be food that is undercooked. This may very well result in health hazards to the consumer of the food cooked in a microwave oven if bacteria is not killed by sufficient cooking. The sensitivity of output power to line voltage is a source of concern to the microwave oven food developer as well as the consumer. Measured power as a function of line voltage is shown in FIG. 18 for three microwave ovens. Note the variation of the 500 watt number two oven indicating a 6% change in line voltage. The output power of the magnetron tube of the microwave oven has decreased from 500 watts to 375 watts. Also, note the non-linear relationship between line voltage and power output of the magnetron tube of the microwave oven. This non-linear relationship will produce wide swings in output power due to rather small changes in line voltage (*Microwave Cooking and Processing*, Charles R. Buffler19xx).

Microwave ovens presently in use employ various data entry mechanisms to input data into an oven control mechanism. These data entry mechanisms may be electrical and mechanical keyboards, card readers, light pens, wands, or the like. The control mechanism may be a computer or a microprocessor based controller. In general, the computer or controller has a basic input and output system (BIOS) associated with the input and output of data to and from the data entry mechanism. In such microwave ovens the user manually actuates the data entry mechanism to enter data relating to the type or mode of oven operation desired, i.e., bake, roast, re-heat, etc., as well as the length of the desired cooking time.

Present microprocessor-based controllers are capable of receiving a substantial amount of complex information from their associated data entry mechanism. This requires the oven user or process stream designer to manually enter a substantial amount of information generally in a multi-step series of data inputs on a keyboard. This information could be entered by a magnetic card containing all of the required input data, but this type of format does not allow flexibility in changing the cooking instructions. Alternately, user input could recall a stored recipe specific to a particular food item. Those familiar with the art can see that an item-specific stored recipe system is static and inherently limited to the universe of food items known to its author at its moment of creation. Such a system is closed to food items or processes created subsequent to its moment of manufacture, and, in any event, is a stored recipe system specific and limited to a single host microwave oven or process stream performance set.

In the manufacture of consumer appliances, such as microwave ovens, it is advantageous to assume that the overall control requirements are nearly the same from model to model. This is done to reduce the cost of manufacture of the microwave ovens and make the repair of the ovens more economical. The functions of the microwave oven such as "auto cook," "auto defrost" and a number of other cooking parameters associated with these functions vary from model to model, depending upon such factors as microwave cavity size, magnetron size, and other factors well known to practitioners in the art. Thus a controller may be required to operate correctly in different microwave oven chassis having different oven cooking cavities. Typical oven cavity size ranges from about 0.5 cubic feet to about 2.0 cubic feet. The ovens also may vary in their effective magnetron power output.

A well known phenomenon concerning the mass of a specimen is documented in the IEC 705 publication. This publication defines a procedure for determining the output power of a microwave oven. Following the IEC 705 procedure a 100 ml specimen of water is placed in a microwave oven. Power is applied to the specimen by the magnetron tube. The water boils at a specific power level in a given time period. The results of this test generated a classification of 800 watts for this particular microwave oven.

To further explain the phenomenon another test may be constructed following IEC 705 procedures. A specimen containing 250 ml of water is placed in the same microwave oven that was used to test the 100 ml specimen and power is applied to the specimen. Performing the same calculations as before the microwave oven now appears to be a 660 watt oven. This particular phenomenon clearly asserts the specimen mass has a pronounced effect on determination of the power rating of the microwave oven.

Microwave power output can be controlled using two methods. The first is duty cycle control, and the second is amplitude modulation. In duty cycle control, the average output can be adjusted by operating the magnetron at full rated power, while switching its current on and off for portions of a time interval. The percentage of time that the current is on during the time interval is referred to as the "duty cycle."

The duty cycle of the microwave oven is generally implemented by electromechanical relays in conjunction with the controls of the microwave oven. The relays provide economies of scale for a manufacturing effort but they do not adequately provide competent electrical current switching.

Magnetron power output is proportional to its cathode current. In amplitude modulation, the cathode current is adjusted to control the instantaneous magnetron output. The instantaneous magnetron current is controlled either by varying the level of high voltage to the magnetron or by changing the magnetic field intensity in the magnetron.

Attempts in the past have been made to monitor magnetron tube power and compensate for the fluctuations in power produced by the magnetron tube. It is well known in the art that when the operating temperature of a magnetron tube increases the power produced decreases. The operating temperature of the magnetron tube will increase due to normal operation. The heat produced by the specimen contained within the microwave oven having work performed thereon will also increase the temperature of the magnetron tube. The specimen does not consume 100% of the power generated by the magnetron tube; therefore, some of that power will be radiated outwardly from the specimen in the form of heat. Given the close proximity of the magnetron tube to the specimen the magnetron tube operating temperature will undoubtedly increase.

Monitoring the output of the microwave oven and then increasing input power to raise the power output of the magnetron tube is a self-defeating effort. As more power is supplied to the magnetron tube the power output of the magnetron tube increases, but the efficiency of the magnetron tube is decreases, thereby increasing the operating temperature. This means the input power should be increased to compensate for the decrease in output power. This process will continue until a maximum input power is achieved thereby saturating the magnetron tube and further decreasing efficiency of the magnetron tube.

Another method of monitoring power output of the magnetron tube is to compare the monitored value of power to the power being delivered to the microwave oven by the power utility company. If these values do not compare after subtracting known losses, a compensation factor extracted from a lookup table has to be determined. This determined correction factor is mechanically or electronically applied to the magnetron tube. Applying this factor in this manner will increase or decrease the amount of power delivered to the magnetron tube. This is a self-defeating effort. If the magnetron tube power is too high the magnetron tube operating temperature will increase causing a decrease in efficiency, as discussed above. This results in a new compensation factor being applied to the magnetron tube power level. This cycle of applying correction factors and adjusting power levels will continue and the result of this effort will not correct the work performed on the specimen disposed within the microwave oven.

It is a well known principle of physics that when a force does work on an object it must increase the energy of that object by a like amount (or decrease if the work is negative). When an object loses energy of any form, it must experience a like increase in energy of some other form, or it must do a like amount of work. Power discussed herein is the time rate of doing work. Power is expressed as an equation: Work=Power×time.

Microprocessor based controllers are in widespread use in commercially available microwave ovens. Typically, the only difference in the command and control from one oven to the next is the programming stored within the controller's memory. It is quite feasible for control programs stored permanently in read only memory (ROM) to include parameters and instructions appropriate for a variety of oven models. Nevertheless, there remains the problem of identifying to the controller the particular oven and different oven or process stream functional characteristics of the host unit in which the controller resides. This particular problem is complicated over time by the introduction of newer models of microwave ovens. Newer models may contain newer microprocessors and different functional characteristic sets that require different operating instructions.

Microwave ovens having compatible hardware can interact and share data. It has been possible in the past to exchange software between identical types of machines. To the contrary, most interactions between incompatible machines still involve little more than simple transfer of data files or the like. Software applications written for one microwave oven manufacturer or for one specific type of operating environment, however, cannot normally be ported or "transferred" to a system having different physical characteristics without being entirely rewritten. While much progress has made in developing techniques for exchanging data between incompatible machines, it has not been possible to exchange software application programs between different microwave ovens.

Data presented in the form of recipe instructions that offer static cooking conditions differ on characteristics of the material to be cooked. The material inherently varies in dielectric property, relative dielectric constant, and loss factor. These properties govern both heating rate and uniformity, the latter being influenced by the depth of penetration of the microwave energy. Accordingly, conventional fixed cooking program functions do not allow the entry of data concerning the conditions of the material to be cooked into memory of the computer or controller of a microwave oven. As a result two materials would be cooked under the same cooking conditions in spite of having different material characteristics and cooking profiles. This causes an undesirable cooking operation.

It would be desirable to have a microwave oven or process control system that could accept pre-defined user entered programming information that could be interpreted and scaled to varying magnetron performance or process performance level(s) and power level duration(s) specific to a particular host unit. As the result of a single user entered predefined code, the final end result of a process performed for a particular item would be independent of and produce identical results upon the item regardless of the functional operating characteristics of any particular host microwave oven or process stream into which the user entered pre-defined code is input.

SUMMARY OF THE INVENTION

The present invention provides an interpretive BIOS machine for controlling the cooking of food or performance of a chemical, physical, or thermodynamic process in any of a plethora of variously sized host microwave ovens or disparate process streams in response to a predetermined code. The present invention allows a host microwave oven or process stream to functionally operate by user independent commands. In the preferred embodiment a system controller is operatively disposed intermediate a data entry mechanism, provided for the entry of a predetermined BIOS interpretable and scaleable code, and the host microwave or process stream. The controller has a central processing module, a memory module, and a plurality of input and output devices to send and receive data to and from the host microwave oven and the data entry mechanism. The interpretive BIOS machine is operatively embedded in the controller's memory.

The interpretive BIOS machine has a plurality of data structures that have data determined by the predetermined code. These data structures provide the controller with instructions to command and control the host microwave oven or process stream, whereby the host microwave oven or process stream operates with user independent functional commands.

The present invention contains interpretive data structures that provide both factory-selected and user defined scalars, altitude, calibration factors and selection of the mode of operation. The calibration data structures allow the user of the present invention to scale the power level and/or the power level duration of the host microwave oven or process in response to performance degradation with age of the magnetron tube, process elements or variations of host unit in-situ elevation above mean sea level. The selection mode also allows the user of the host microwave oven or process stream to use the present invention to operate the host microwave oven or process stream in its original conventional mode of operation.

A second embodiment of the present invention is a Work Manager disposed within the BIOS machine. The Work Manager controls the work performed on a specimen disposed within the confines of a Work Manager oven. The Work Manager is implemented by a controller. The controller has a memory for storing a software program or a plurality of data structures that provide commands and functions for the operation of the Work Manager. The controller also has at least one sensor operatively connected within the microwave oven for detecting the power supplied to the microwave oven magnetron tube. The sensor periodically transmits selected power data to the BIOS machine for processing. A predetermined code is determined from the specimen and entered by the user into the microwave oven. The predetermined code delineates a work characteristic particular to the selected specimen. The interpretive BIOS machine receives the predetermined code. The BIOS machine also receives power data periodically transmitted from the power sensor for processing. The power data and the predetermined code are processed by the Work Manager. An instruction set is generated by the Work Manager. The instruction set transforms the power data and the predetermined code into commands for work to be performed on the specimen by the microwave oven. The result of this operation will be that the microwave oven magnetron tube (or physical, chemical, or thermodynamic process stream) delivers the required work to the sample independent of power supplied to the microwave oven.

A third embodiment of the present invention is a Code Maker. The Code Maker receives selected work characteristics particular to a specimen disposed in a microwave oven requiring work to be performed thereon. The output of the Code Maker is a selected predetermined code. The format of the code is a selected symbol representing the code. The predetermined code encapsulates a profile indicative of the work to be performed on the specimen. The profile is selected from a group consisting of required specimen heating time(s), specimen geometry, heating power levels, specimen mass, the specimen material composition, and the like.

Accordingly, an object of the present invention is to provide a BIOS that will enable or allow transfer of software application across incompatible hardware and operating systems environments, the result of which is identical heating or process result upon a specimen regardless of the power output capacity and power performance capability of the particular performing microwave oven, or physical, chemical, or thermodynamic process stream.

Another object of the present invention is to provide a BIOS that allows a set of semantic and syntactic rules that determines the behavior of functional units in achieving communications across application programs and dissimilar microwave ovens or process streams.

Another object is to enable food manufacturers, cookbook authors, chemical or physical or thermodynamic process designers and so forth to express complex processing instructions from within a universal BIOS interpreted and host unit internally scaleable user friendly (yet functionally rich when interpreted by the BIOS) symbolic code.

Another object is to manage the work performed on a specimen placed in a microwave oven so as to produce a heating or process result upon a specimen identical to the result produced within other differing microwave ovens (or chemical, physical, or thermodynamic process streams) of varied performance output capabilities, or like microwave ovens or process streams of differing age(s) or in situ elevation(s), all operating under widely varied supplied power conditions.

Other objects, features and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 15 illustrates a Code Maker computer screen tool for capturing the work requirements of a specimen.

DESCRIPTION OF THE PREFERRED EMBODIMENTS

Figure 3:
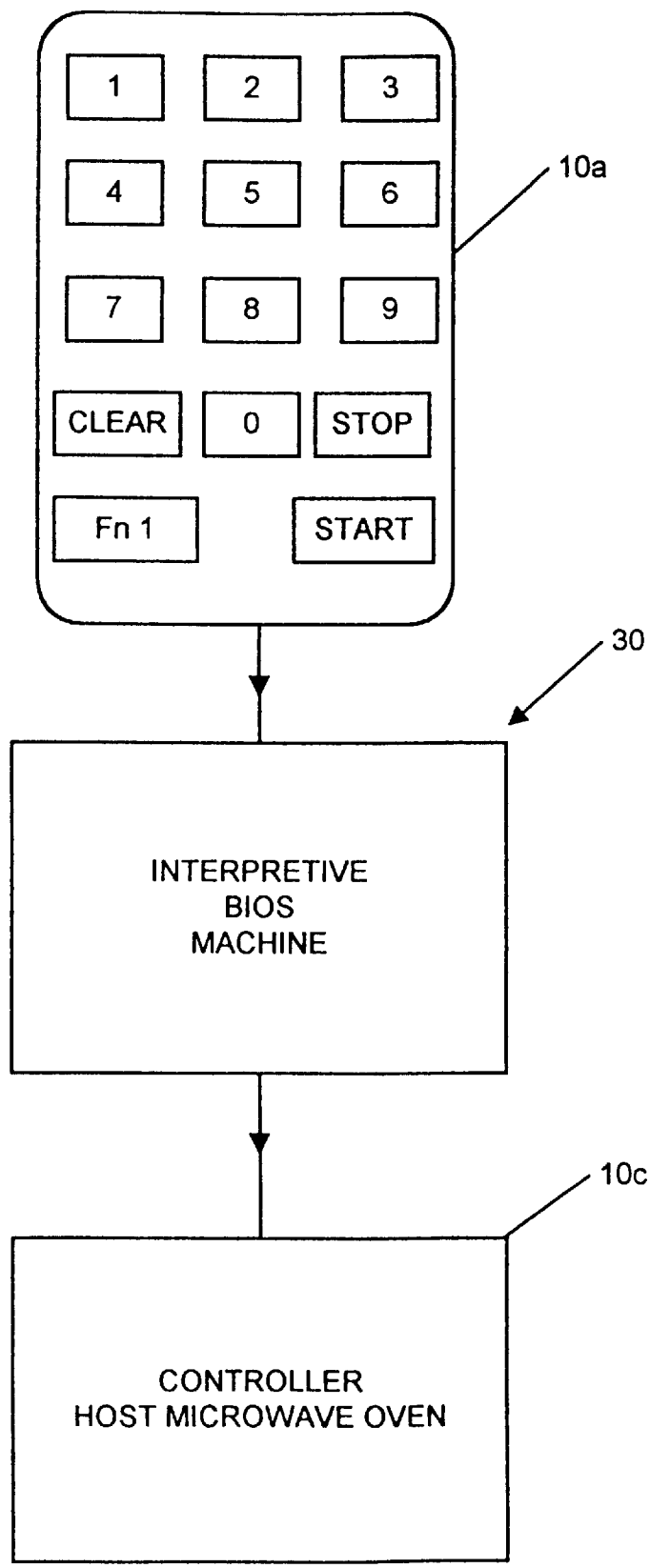
FIG. 3 illustrates the present invention disposed intermediate the key pad of FIG. 1 and the controller of the host microwave oven.
Figure 5:
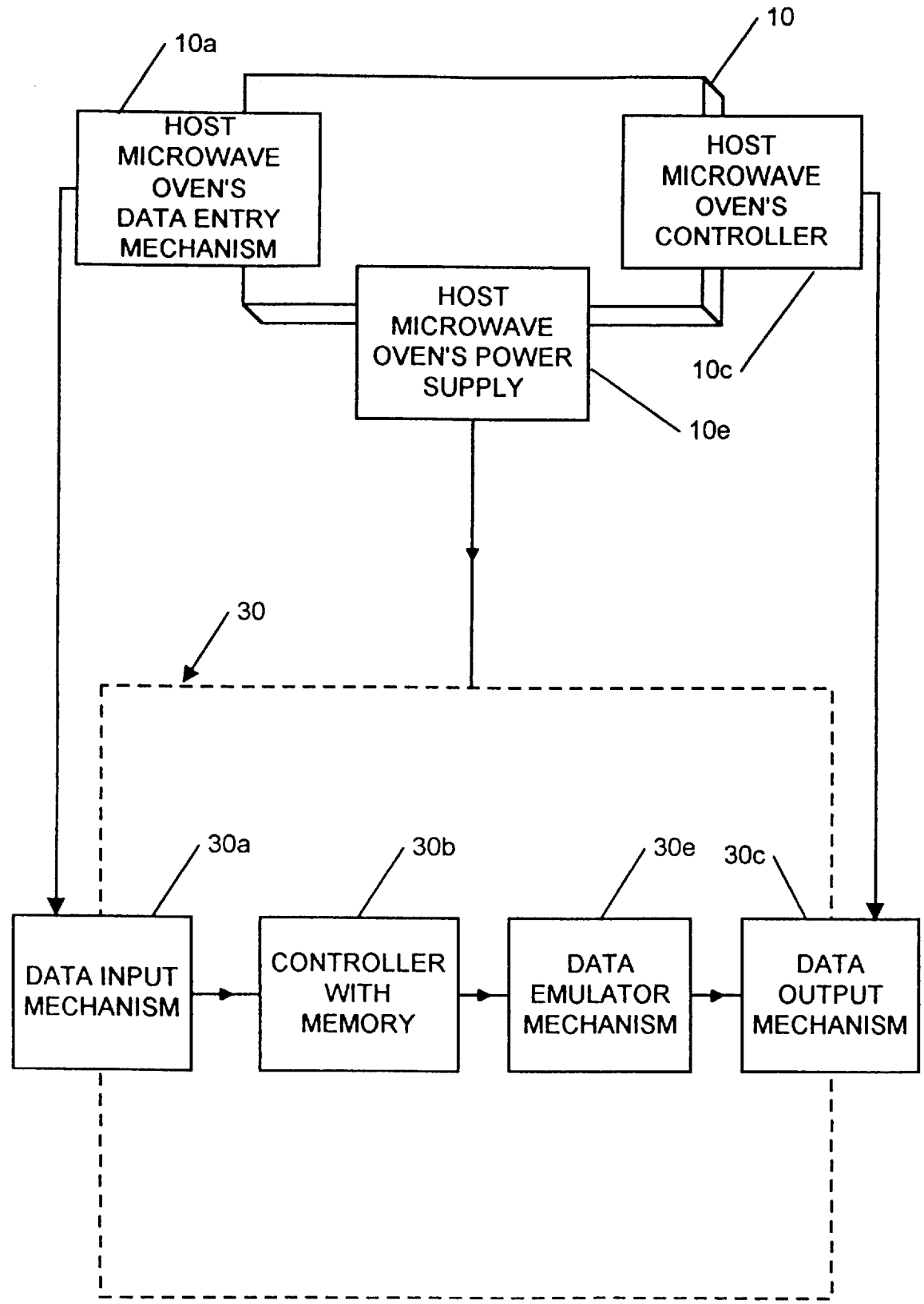
FIG. 5 illustrates a block diagram of the interpretive BIOS machine connected to the host microwave oven.
Figure 6:
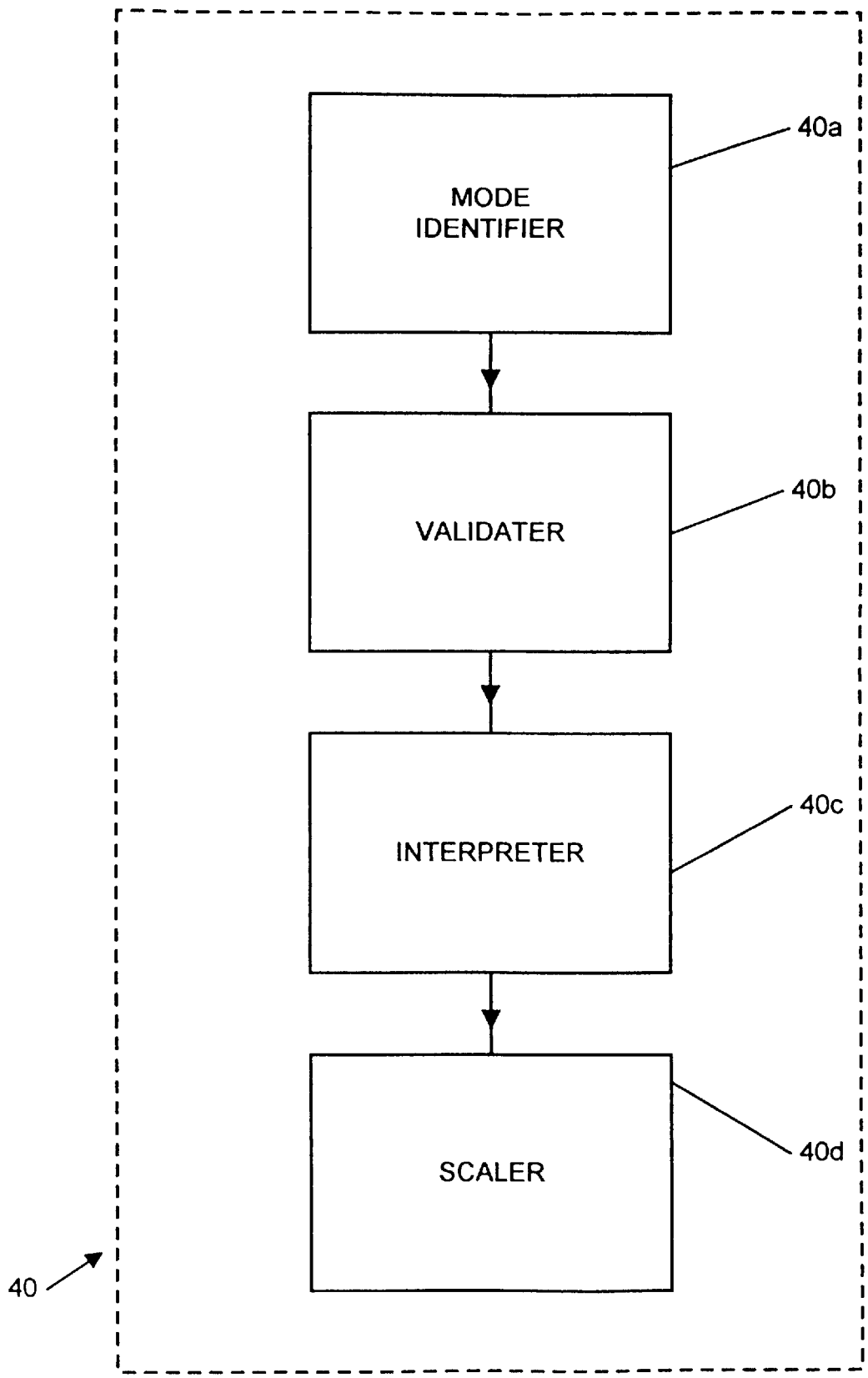
FIG. 6 illustrates the architecture for interpretive BIOS machine of FIG. 5.
Figure 7:
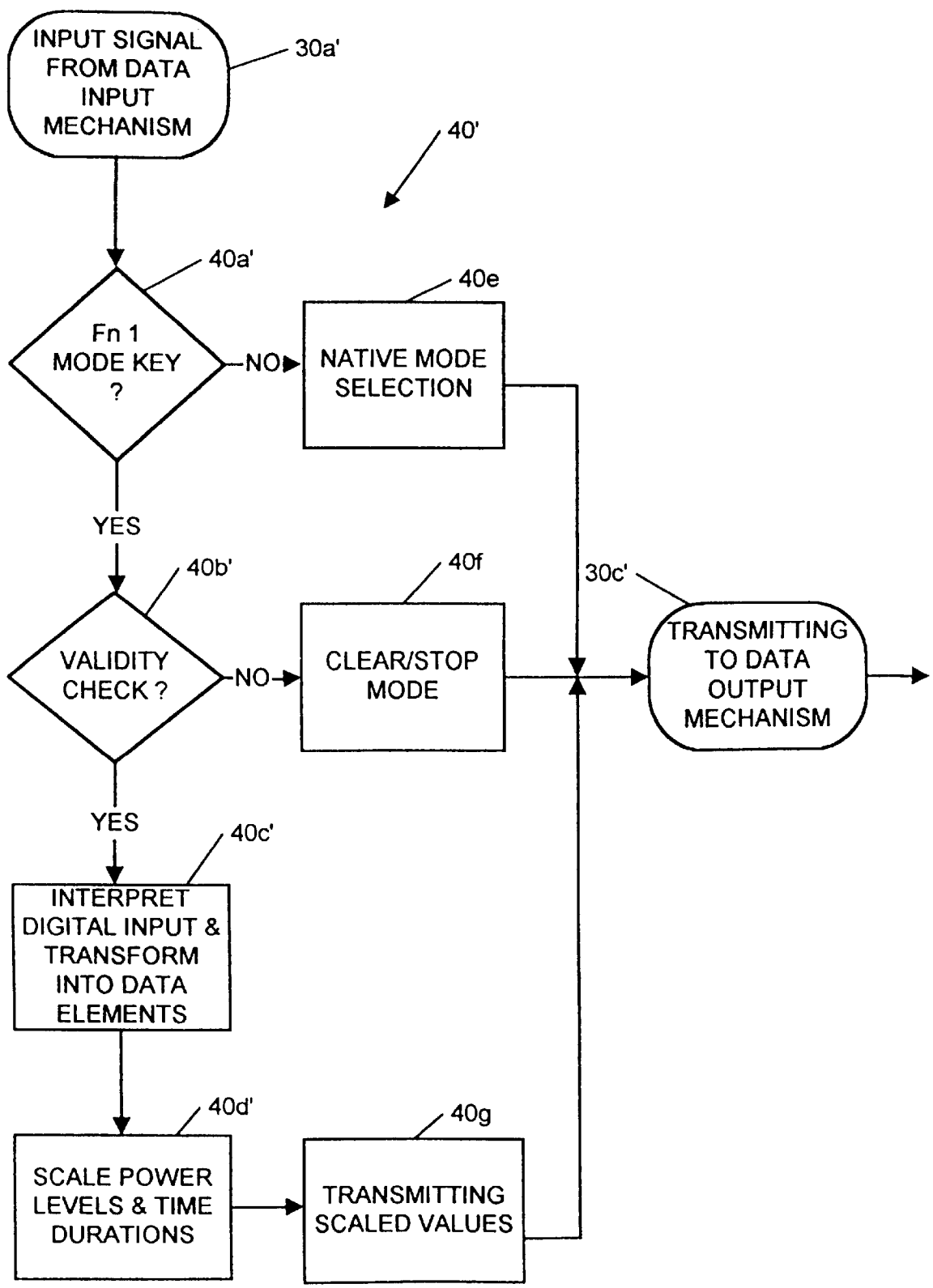
FIG. 7 illustrates a flow diagram of FIG. 6, FIG. 8 illustrate a flow diagram of the validator of FIG. 6.

The interdependence of the element numbers of the drawings has been referenced above and for the convenience of the reader will be reiterated here by citing an example of the flow of element numbers to drawings. This example is intended for illustrative purpose only: interpretive BIOS machine 30, FIG. 3, is further illustrated in a block diagram 30, FIG. 5. The architecture for interpretive BIOS machine 30, FIG. 5, is generally illustrated at 40, FIG. 6. Architecture 40 is further illustrated at 40', FIG. 7. Mode key 40b', FIG. 7, is further illustrated at 40b', FIG. 8, containing elements 40b'a to 40b'f.

Figure 1:
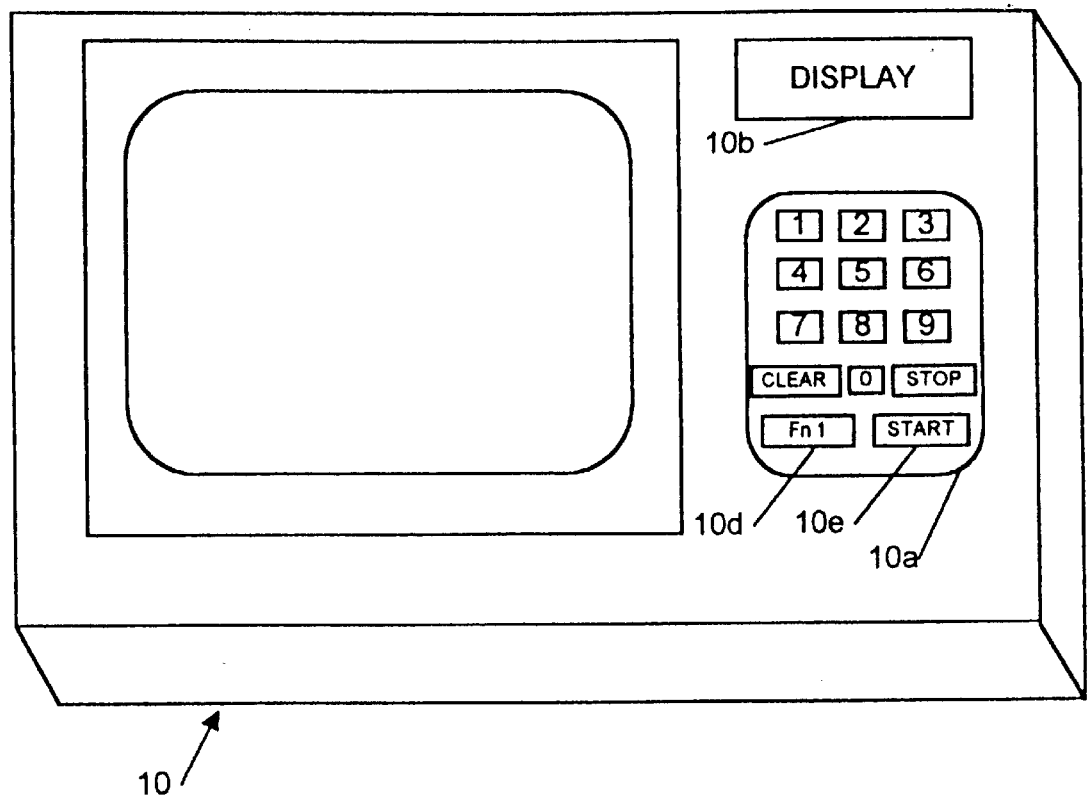
FIG. 1 illustrates a schematic view of a host microwave oven.
Figure 2:
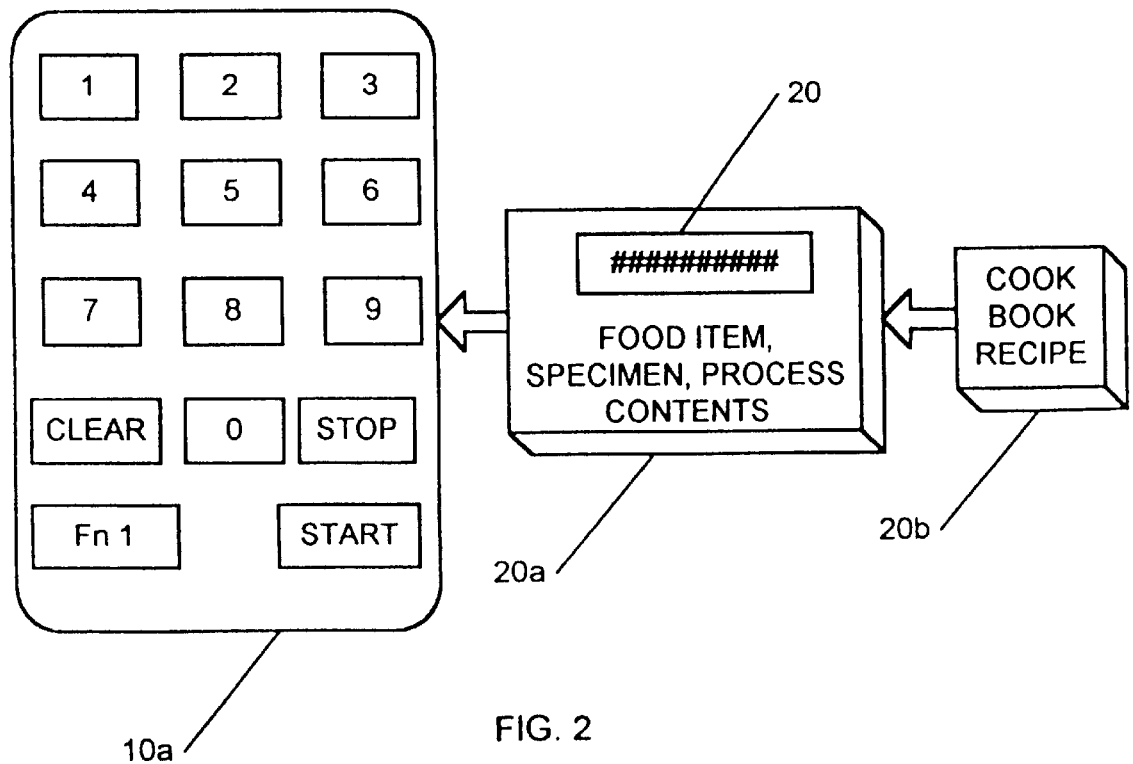
FIG. 2 illustrates a block diagram showing a symbolic code being entered into the keypad of FIG. 1.

FIGS. 1–3 illustrate a typical microwave oven 10 used by households, restaurants, and other types of institutions that prepare and cook food. An example of a typical microwave oven would be a microwave oven manufactured by Cober Electronics, Inc., although any microprocessor, computer, or ASIC (Application Specific Integrated Circuit) controlled microwave oven or process stream is usable and operable in conjunction with the present invention. Microwave oven 10, for the purposes of illustration only, will host the present invention.

Host microwave oven 10 has a data entry mechanism 10a, a display 10b, and a computer or controller with memory 10c, as shown in FIG. 3. Data entry mechanism 10a may, if desired, be any type of data entry mechanism suitable for inputting data into host microwave oven 10. Data entry 10a mechanism may, if desired, transmit its data by serial or parallel format using any type of transmission medium such as, but not limited to, key pad entry, bar code reader, modem, computer or telephonic communications network or any other medium that allows transmissions of data. An example of data entry mechanism 10a would be a key pad part number KBD-KPX17P, manufactured by Alps, San Jose, Calif. Data entry mechanism 10a for the purposes of illustration only will be discussed as a conventional touch responsive key pad known to those of ordinary skill in the art, although any data entry mechanism will function in conjunction with the present invention. Data entry mechanism 10a has at least one mode key. If desired, a plurality of mode keys may be implemented in conjunction with the present invention. For the purpose of illustration only, key Fn 1, 10d, of data mechanism 10a will indicate the desire by the user of microwave oven 10 to enter a selected predetermined code 20, as shown in FIG. 2. Selected code 20 represents a predetermined instruction set for heating or cooking a manufactured food item 20a. That predetermined code may, if desired, be listed in a recipe cook book 20b containing a plurality of predetermined codes. The cook book 20b may, if desired, contain selected codes along with conventional cooking instructions. Selected code 20 may, if desired, be comprised of at least one numeral, letter or symbol. An example of selected code 20 is a series of seven numbers. Manufactured food item 20a may require a plurality of processing steps to fully cook the foodstuffs properly. In this particular case selected code 20 may represent any combination of process, steps of cooking, or cookbook recipe. Ordinarily, the code 20 will be printed on or otherwise associated with the food packaging. Alternatively, a book of codes 20 can be assembled and provided to the user, most likely by the manufacturer of the food, a cookbook author, or process designer.

The present invention is an interpretive BIOS machine illustrated generally at 30, as shown in FIG. 3. Interpretive BIOS machine 30 is operatively disposed between the data entry mechanism 10a of the host microwave oven 10 and controller 10c. Interpretive BIOS machine 30 receives and processes selected code 20 and then outputs its interpreted and scaled instruction set to controller 10c. The interpreted instruction set provides host microwave oven 10 with user independent instructions for the cooking of food items desired by the user. The interpreted instruction set may contain one or a plurality of data fields that will compensate for variations in oven magnetron power, other similarly sized magnetron tube microwave oven performance variations, in-situ microwave oven elevation above sea level, aging of the host microwave oven, and the variation of cooking recipe requirements.

Figure 4:
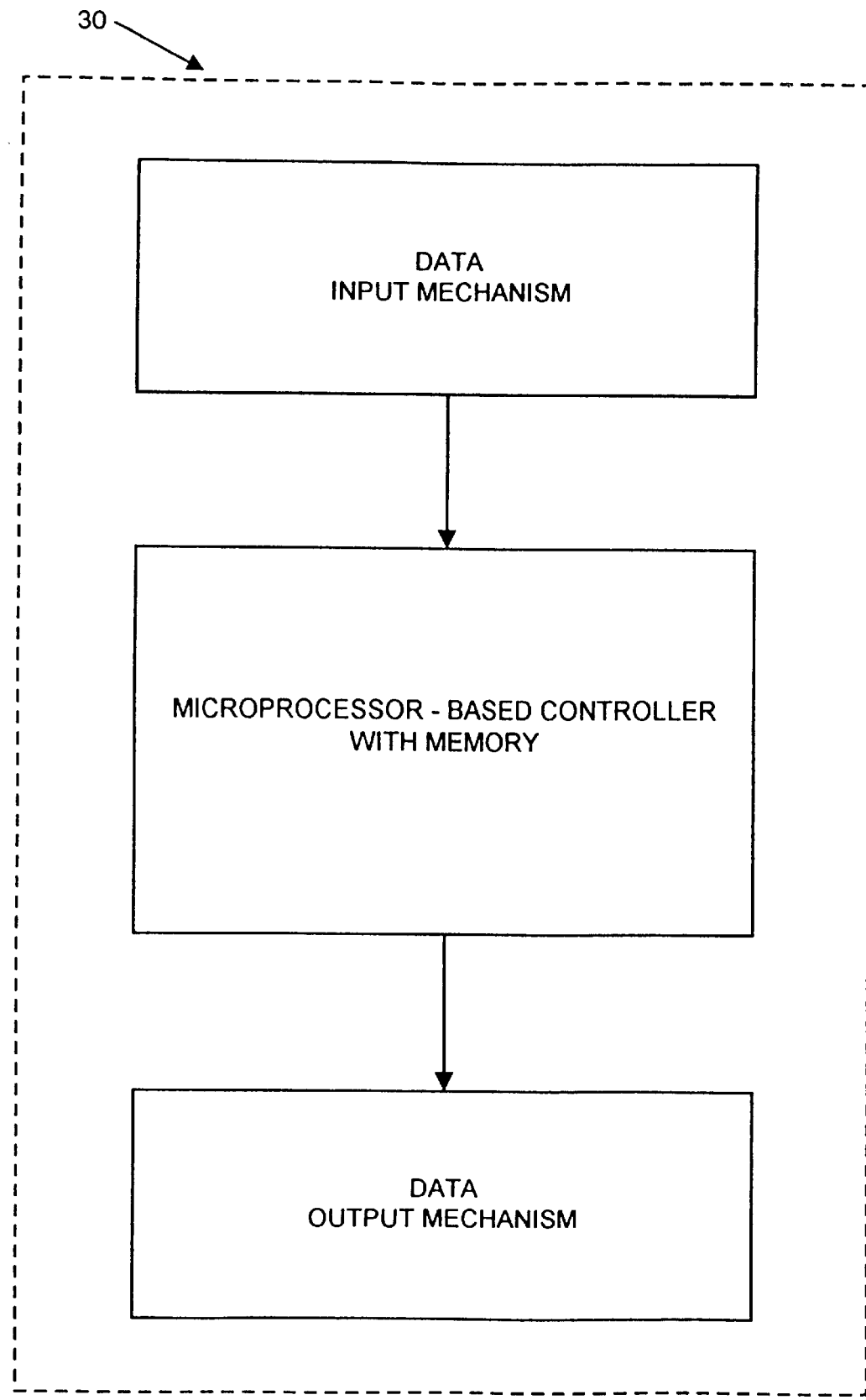
FIG. 4 illustrates a block diagram of an interpretive BIOS machine.

A top level illustration of interpretive BIOS machine 30 is shown in FIG. 4. Interpretive BIOS machine 30 comprises a data input mechanism 30a, a microprocessor base controller 30b, and a data output mechanism 30c. As shown in FIG. 5, interpretive BIOS machine 30 receives its operational power from power supply 10e. Data input mechanism 30a comprises a buffer that connects the output of data entry mechanism 10a of host microwave oven 10 to the input of controller 30*b*. An example of this buffer would be at least one Hex Non-inverting Buffer, MC14050b, manufactured by Motorola, Inc., Phoenix, Ariz. Controller 30*b* commands and controls all the operational functions of the present invention. An example of controller 30*b* that may, if desired, be used in conjunction with the present invention is MC68HC11 manufactured by Motorola, Inc. This particular controller has an on-board memory used for storing data structures that provide controller 30*b* with instructions as to the operational features of the preset invention. Data emulator mechanism 30*e* is connected to controller 30*b* and receives encoded instructions from controller 30*b*. Data emulator 30*e* transforms those encoded instructions into suitable data for controller 10*c*. An example of data emulator would be a plurality or bank of operationally connected CD 5053 or CD 4051 devices. The output of data emulator 30*e* is connected to data output buffer 30. The output of mechanism 30*c* is connected to controller 10*c*. Interpretive BIOS machine 30 is completely buffered from host microwave oven 10 and is transparent to the user of host microwave oven 10. This buffering allows host microwave oven 10 to operate utilizing the present invention or to operate in the native mode, i.e., receiving data inputs directly from the user. The architecture for interpretive BIOS machine 30 is generally illustrated at 40, as shown in FIG. 6. Architecture 40 contains a plurality of data structures that have their data determined in part by selected code 20 and in part by the interaction between respective data structures. These data structures provide controller 30*b* with instructions to command and control the host microwave oven 10 thereby allowing host microwave oven 10 to function independent of user commands.

Mode Identifier data structure 40*a*, as shown in FIG. 6, receives its data from data entry mechanism 10*a*. Mode Identifier data structure 40*a* has data elements that determine if the interpretive BIOS machine is requested for activation or if the user of host microwave oven 10 desires to operate the oven in its native mode. Native mode, once detected by Mode Identifier data structure 40*a*, operates without the assistance of interpretive BIOS machine 30. Mode Identifier data structure 40*a* passes the request for BIOS machine activation to Validator data structure 40*b*. Validator data structure 40*b* has elements that determine the validity of the input code 20 selected by the user. If Validator data structure 40*b* determines that selected code 20 is valid, data structure 40*b* will pass that result to Interpreter data structure 40*c*. Upon receiving Validator result, Interpreter structure 40*c* will transform user input code 20 into a data element set containing a plurality of data fields representing the requested duration and power level process instruction set of the selected code 20. Interpreter structure 40*c* may, if desired, transform user input code 20 into a data element set containing a plurality of data fields representing requested time duration and variable power level process instruction set of selected code 20.

Scalar data structure 40*d* receives the data element set from Interpreter data structure 40*c*. Scalar data structure 40*d* transforms those data fields into suitable duration and power level requirements depending on the oven manufacturer's predetermined selection of scaling factor and additional user defined scale factor(s). Scaling factor(s) will be disclosed in greater detail hereinbelow. The scale duration and power data elements are encoded into a format that is understood by the host microwave oven 10.

FIG. 7 shows a logical flow diagram, indicated generally as 40' of the operational features of the interpretive BIOS machine 30 provided by architecture 40. An input data signal 40*a*' is received from host microwave oven 10. This input may, if desired, be accompanied by data generated by the user depressing the Fn 1 mode key 10*d* at least once. The mode of operation selected by the user is now determined. If Fn 1 10*d* is present the interpretive BIOS machine 30 has been selected. If Fn 1 10*d* is not present the native mode has been selected by the user and that selection 40*e* is transmitted to host microwave oven 10. The validity 40*b*' of input data signal 30*a*' is now verified. If there is user error in input data signal 30*a*' the user will be notified by instructions that appear on display 10*b*. If inaccuracies in data signal 30*a*' cannot be resolved, the validity check 40*b*' will default to a clear/stop function 40*f* and transmit that signal to the native mode of host microwave oven 10. If validity 40*b*' is verified, data signal 30*a*' is interpreted 40*c*' and transformed into data element set 40*c*' containing power levels and time duration (s). Data element set 40*c*' is then scaled at block 40*d*' to the operating characteristics of host microwave oven 10. Those scaled values 40*d*' are then transmitted at block 40*g* to host microwave oven 10 for implementation in the process of cooking food item 20*a*.

Figure 8:
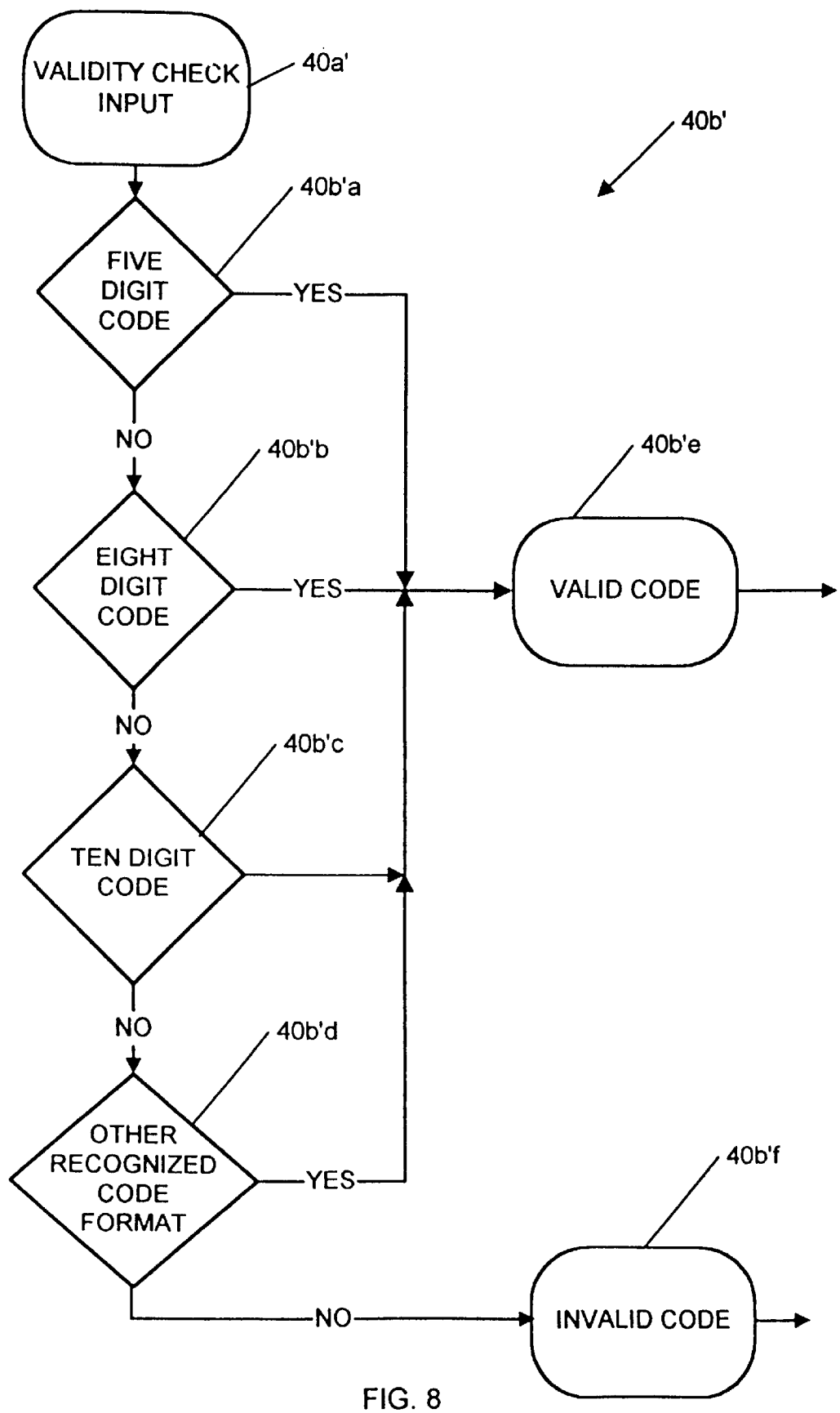

FIG. 8 shows a more detailed diagram 40*b*' of validation data structure 40*b*. Mode function 40*a* transmits an encoded data stream that is received by validated data structure 40*b*'. That data contains at least one data bit and may, if desired, contain a plurality of data bits. In the preferred embodiment, a five digit code at block 40*b*'a is transmitted by mode function at block 40*a*. This transmission is for illustrative purpose only. In fact, any number of digits may be transmitted. An eight digit code at block 40*b*'b, a ten digit code at block 40*b*'c, and other Interpretive BIOS Machine recognized code format(s) at block 40*b*'d may be transmitted. If the code at block 40*b*'e is valid it is transmitted to Interpreter data structure 40*c*. If the code at block 40*b*'f is invalid, a clear/stop function is transmitted to host microwave oven 10.

Figure 9:
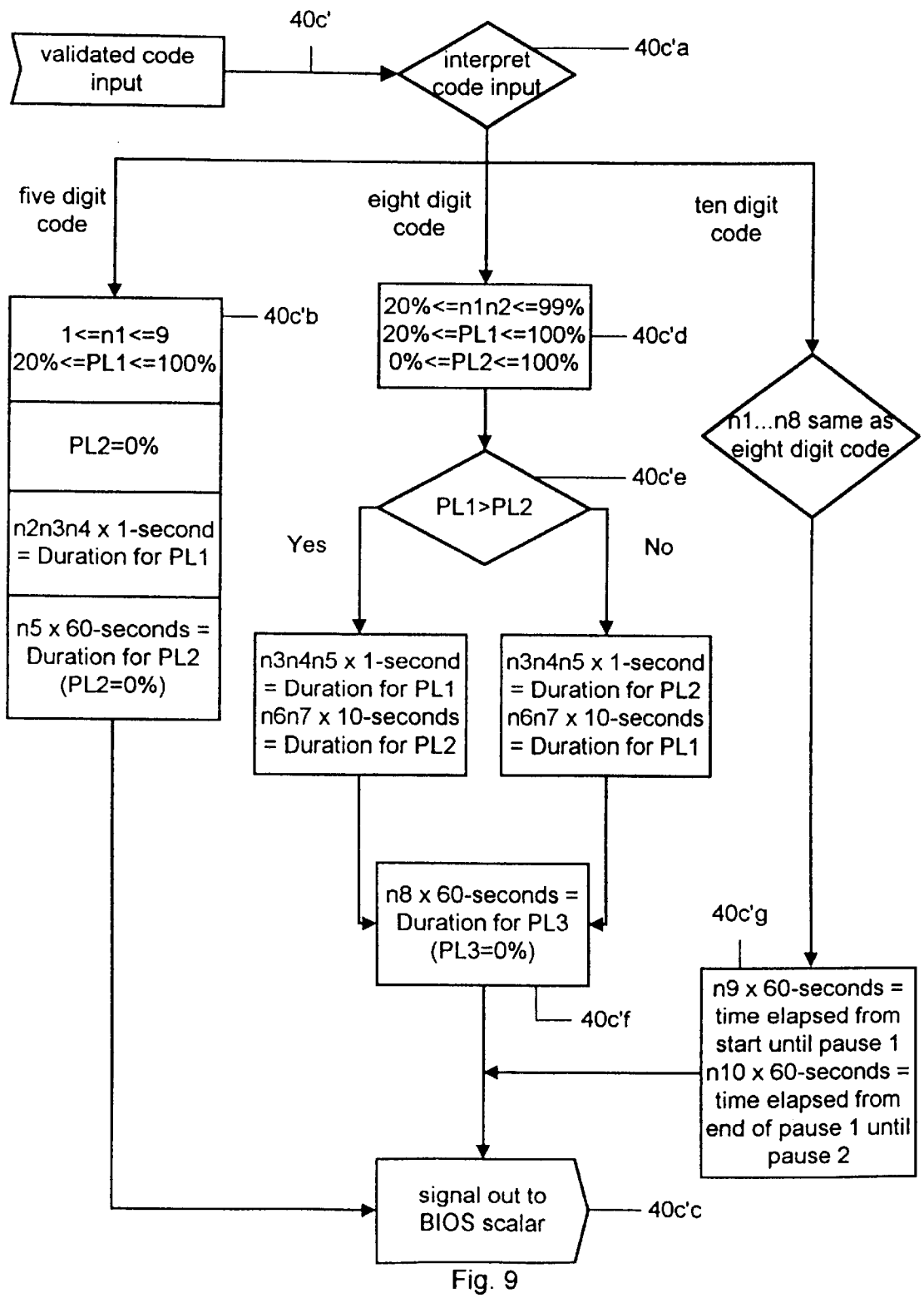
FIG. 9 illustrates a flow diagram of the interpreter of FIG. 6.

FIG. 9 shows a more detailed diagram of Interpreter data structure 40*c* is illustrated at block 40*c*'. A validated code at block 40*b*'e is received and the code input is interpreted at block 40*c*'a as being a five, eight, or ten digit code. If the interpreted code is five digits at block 40*c*'b, the first digit n1 is equal to or greater than one and equal to or less than nine and is interpreted by the BIOS to Power Level 1 (PL1), expressed as a percentage of the magnetron tube's total output capacity; i.e., 100%, 90%, and so forth. For a five digit code power level PL2 is equal to 0%. PL1 duration is equal to the digit n2, n3, and n4 multiplied by one second. The five digit code is now interpreted and transformed into a new code representing specimen 20*a*'s requirements for processing or cooking. This requirement for processing or cooking will vary depending on the specimen involved. This new five digit code is transmitted 40*c*'c to the scalar data structure 40*d*. If an eight digit code at block 40*c*'d is received by interpret code input at block 40*c*'a, digit n1 and n2 are equal to or less than ninety-nine and equal to or greater than twenty. Power level PL1 is less than or equal to one hundred percent and equal to or greater than twenty percent. Power level PL2 is less than or equal to one hundred percent and equal to or greater than zero percent. If PL1 is equal to or greater than PL2 at block 40*c*'e, digits n3, n4, and n5 are multiplied by one second and are equal to time duration one. Duration for PL2 is equal to digit n6 and n7 multiplied by ten seconds. If PL2 is equal to or greater than PL1 40*c*'e, digits n3, n4, and n5 are multiplied by one second and are equal to power level two duration. Duration for PL1 is equal to digit n6 and n7 multiplied by ten seconds. Time duration three is equal to n8 multiplied by sixty seconds with power level PL3 equal to zero at block 40c′f. The eight digit code is now decoded and transformed into a new code representing the requirement for processing or cooking of specimen 20a. This new eight digit code is transmitted at block 40c′c to the scalar data structure 40d. A ten digit code is transformed in much the same way as the eighth digit code except for digit n9 that is multiplied by 60 seconds and is then equal to the time that has elapsed from the start process until pause one. Digit n10 is multiplied by sixty seconds and is then equal to the elapsed time since the end of pause one until pause two. (Enablement of pause one and pause two allows for user intervention and intermediate user actions during the processing or cooking sequence.) The user determines when the pause is complete and the control program is to resume by pressing Fn 1-10d. Like the five and eight digit code the ten digit code is transmitted to scalar data structure 40d.

Scalar data structure 40d has both manufacturer selected and user selected components. Scalar data structure 40d has its manufacturer selected universe of data empirically derived from the testing of a plurality or the universe of microwave ovens. A statistically derived sample of the universe of microwave ovens was selected. The sample ovens were each tested in an environmentally controlled and reproducible atmosphere to ensure repeatability of the test due to variations in ambient temperature, humidity, and atmospheric pressure. A control microwave oven was also tested to ensure accuracy and repeatability of the test. An example of the control microwave oven would be a microwave oven manufactured by Cober Electronics, Inc. The control microwave oven was tested to a control standard defined as a microwave oven containing a 1200 watt magnetron tube. The oven is placed in an environment maintained at an atmospheric pressure corresponding to that of an altitude of zero feet above mean sea level at a constant temperature of 20° C. and an ambient humidity of 80%.

Figure 10:
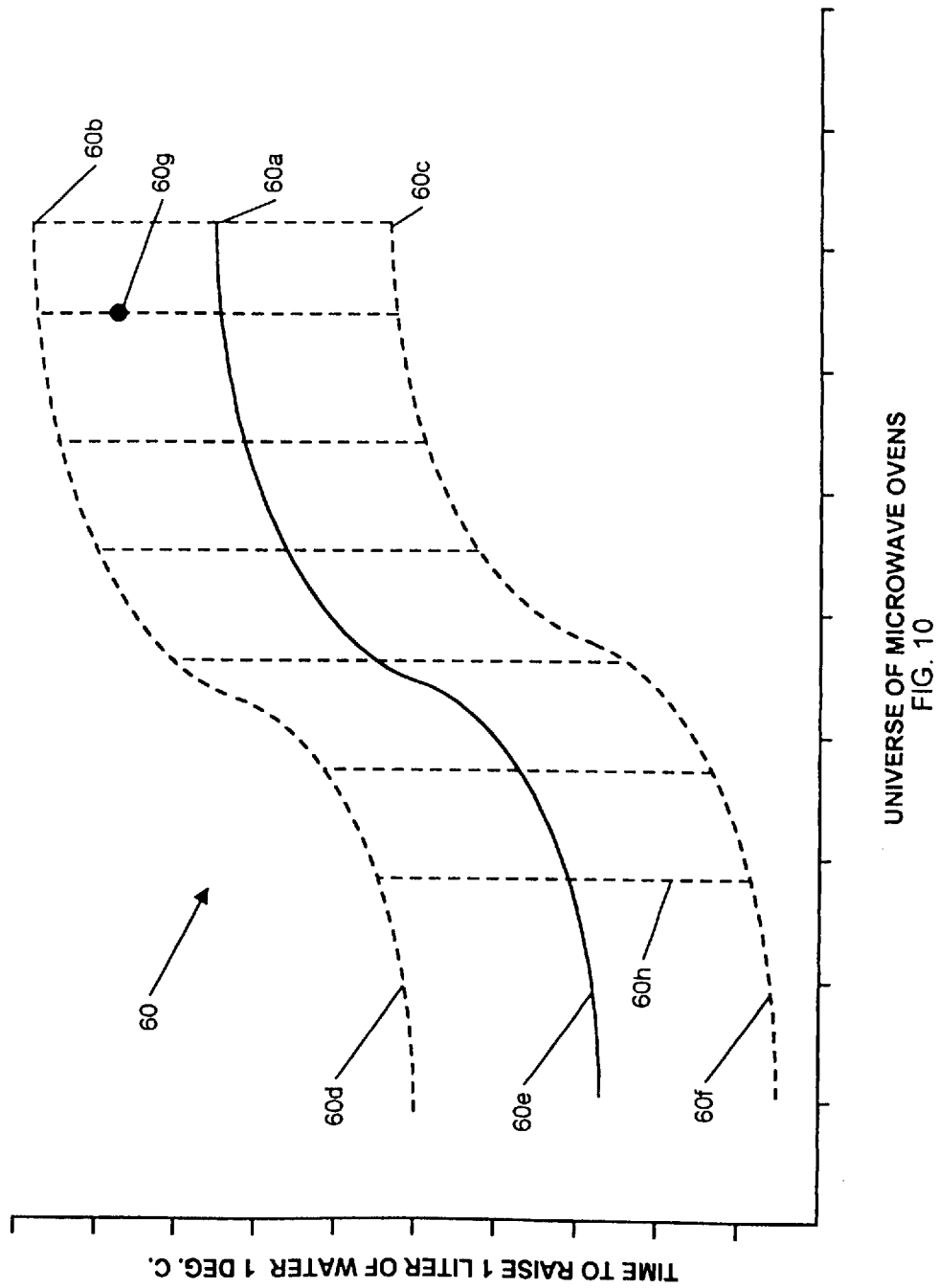
FIG. 10 is a test result graph.

The test comprised a series of testing iterations, the purpose of which was to characterize a microwave oven's (or thermodynamic, chemical, or physical process stream's) effective work production (i.e., work performed upon a sample calculable in watt-seconds) when heating samples of varying mass, composition, and container dimensions and geometry. A single test upon a sample of defined mass and composition and container geometry is herein described. The test comprised placing one liter of water of specifically known and reproducible chemical composition, molarity, molality, and dielectric properties in each microwave oven with a pyrometer disposed in each liter of water. The magnetron tube of a selected microwave oven was activated and the time to raise one liter of water one degree centigrade was recorded. The results of that test are generally illustrated in graph 60 in FIG. 10. The median time range versus the universe of microwave ovens is illustrated at point 60a. The highest deviation from point 60a is illustrated at point 60b. The lowest deviation from point 60a is illustrated at point 60c.

Points 60a, 60b, and 60c can be correlated to the highest power, measured in watts, of the magnetron tube used in each test. Conversely, points 60d, 60e, and 60f can be correlated to the lowest power, measured in watts, magnetron tube used in this test.

A plurality of scalar values may now be determined from graph 60. Those scalar values are derived from the distance a select scalar point is to the median 60a, measured along the vertical axis of graph 60. Any number of points may, if desired, be disposed along any given vertical line extending from median line 60a. An example of that scalar value is scalar point 60g representing a value of 0.25 and scalar point 60h 4.0. The selected scalar values when applied to data element set 40c′ transform the power and time duration contained within data element set 40c′ into operating characteristics for microwave oven 10.

To compensate for the magnetron tube (and other components) as well as the power level output degradation of microwave oven 10 over the useful life of the oven, a dynamic user-initiated BIOS calibration scalar component may be activated. The dynamic BIOS calibration updates in real time the power output operating and performance characteristics of the microwave oven 10 to the BIOS output scale level selected at the time of manufacture. A method to implement the calibration of microwave oven 10 is to depress Fn 1, 10d twice, whereupon display 10b will indicate the current BIOS operating level. By depressing Fn 1 10d simultaneously with a selected keypad number corresponding to the degree of BIOS, timed duration output scale level will increase desired scale value. An example of this would be pressing 1 causes a 5% BIOS output scale level increase, pressing 3 causes a 10% BIOS output scale level increase, etc. The display will flash at least three times, indicating calibration is in process and the display 10b will now display the selected increase or decrease to the BIOS scaled value. To reset the BIOS scaled value to the original value, Fn 1 10d is depressed along with the key zero.

Another method of calibrating power level duration for microwave oven 10 is by depressing Fn 1 10d simultaneously with the start key 10e. This action will commence the National Postal Code ("zip code") BIOS calibration. Display 10a will flash the factory set BIOS National Postal Code. If this code is different than user's current postal code, the user may, if desired, enter their current National Postal Code. Interpretive BIOS machine 30 reads a stored National Postal Code corresponding to the elevation above mean sea level and the BIOS machine 30 performs a self calibration to adjust the power level duration to reflect the increase in elevation. The elevation above mean sea level may, if desired, be entered directly or a one digit direct input read from an Elevation Range-Performance Characteristic Table may be entered. In all cases interpretive BIOS machine 30 will perform a self calibration to increase or decrease the power level duration of microwave oven 10.

The user of host microwave oven 10 may now cook food item 20a without regard for type of microwave oven employed, the power or aging of the magnetron tube of the selected microwave oven, or the in-situ elevation above mean sea level of the installed microwave oven or process stream.

Figure 11:
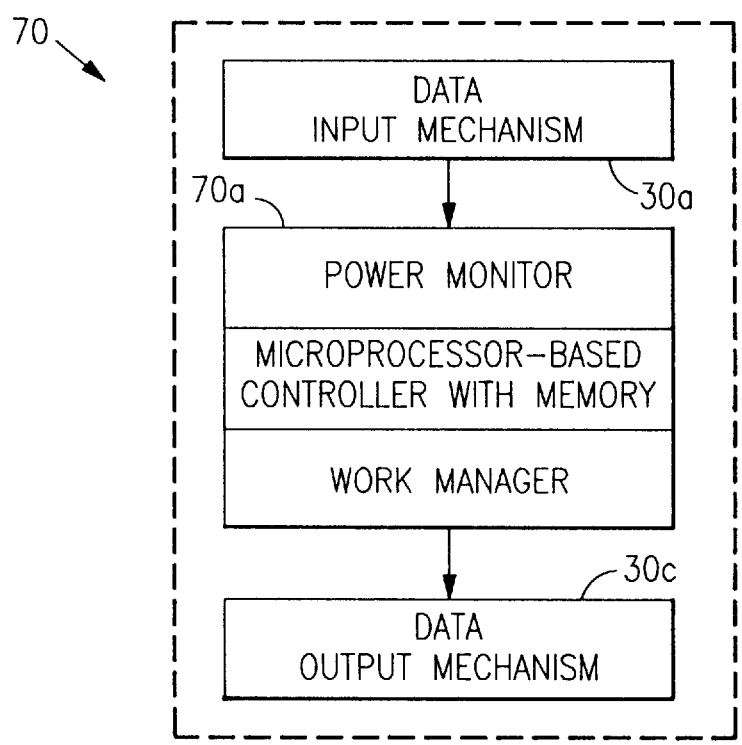
FIG. 11 illustrates a block diagram of a second embodiment of an interpretive BIOS machine.
Figure 12:
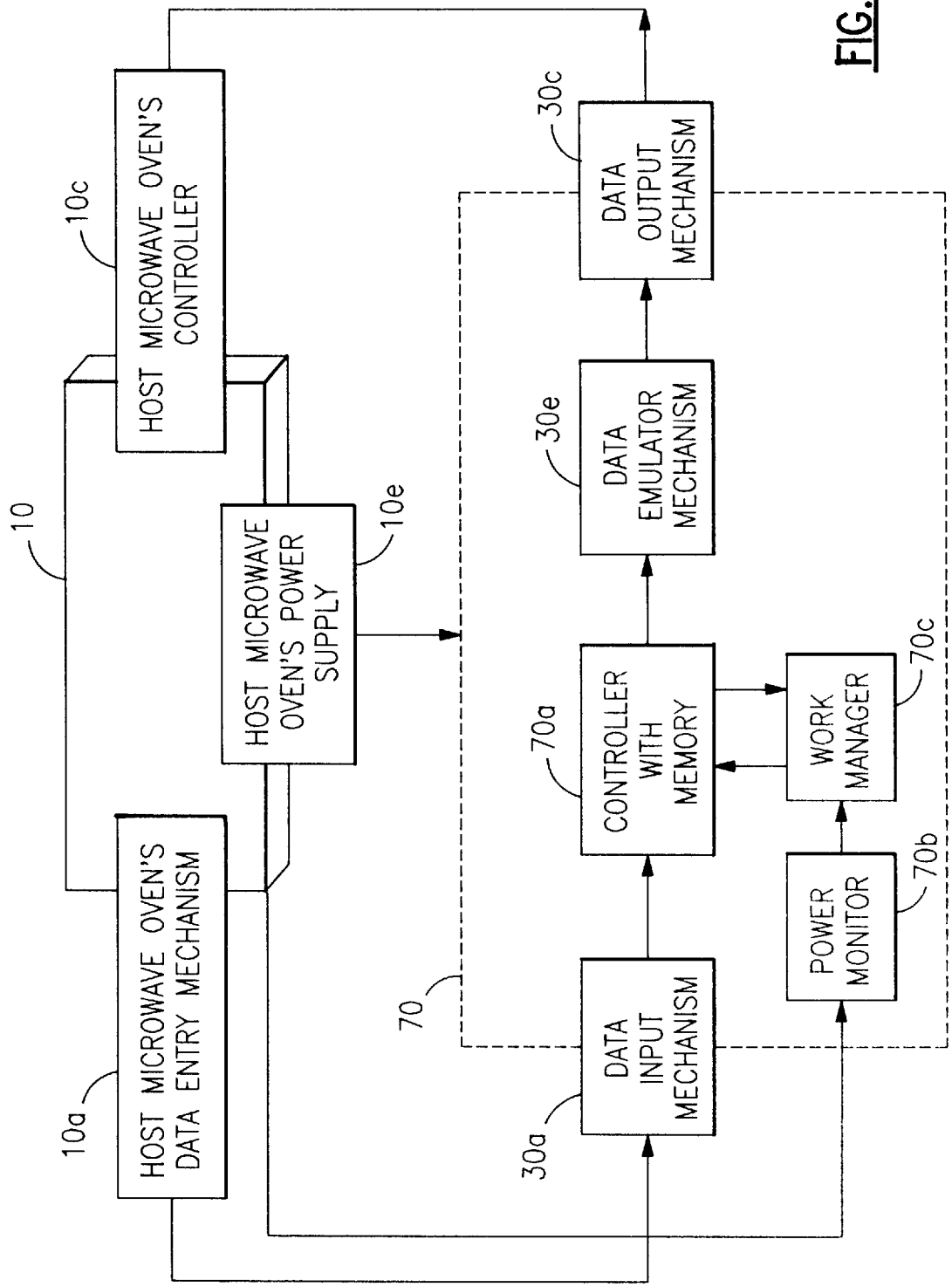
FIG. 12 illustrates a block diagram of the interpretive BIOS machine with a Work Manager connected to the host microwave oven.

A top level illustration of the second embodiment of an interpretive BIOS machine 70 is illustrated in FIG. 11. Interpretive BIOS machine 70 comprises a data input mechanism 30a, a microprocessor base controller 70a, and a data output mechanism 30c. As shown in FIG. 5, interpretive BIOS machine 70 receives its operational power from power supply 10e. Data input mechanism 30a and data output mechanism 30c are interactively connected to controller 70 and host microwave oven 10 (discussed above). Controller 70a comprises in part a power monitor 70b, FIG. 12, and Work Manager 70c, FIG. 12. Controller 70a commands and controls all the operational functions of the second embodiment of the present invention. An example of controller 70a that may, if desired, be used in conjunction with the second embodiment of the present invention is MC68HC11 manufactured by Motorola, Inc. This particular controller has an on-board memory used for storing a software program or data structure that provide controller 70a with instructions as to the operational features of the second embodiment of preset invention.

Work Manager 70b is a software program or a plurality of data structures stored in the memory of controller 70a. The program provides the Work Manager 70c with instructions to interactively control the work function of the microwave oven. An example of this control would be the Work Manager 70b monitoring, correcting, adjusting, or modifying the work performed on a specimen. Another example would be the Work Manager collecting data from at least one sensor and transforming that data into commands for magnetron tube power to controller 70a. The controller 70a has a power monitor 70b connected to the power supplied to the microwave oven for detecting power consumed by the microwave oven. The power monitor 70b may, if desired, be a sensor connected to the magnetron tube of the microwave oven. The sensor may, if desired, monitor, collect or transmit data to the Work Manager 70c. The data may, if desired, be in a serial or parallel format. The data collected may, if desired be derived from voltage, current, power, power factor, or any phase relationship between any of the aforementioned. An example of a typical power monitor measurement is voltage reading 70b' and current reading 70b", FIG. 13. These two readings, 70b' and 70b", are transmitted to the Work Manager 70c for processing. The means of data transmission from the power monitor 70b to Work Manager 70c may be any ordinary transmission means known to those skilled in the art of data transmission. Power monitor 70b generated data is periodically transmitted to the Work Manager 70c or if desired the Work Manager 70c may request or poll any one or all of the power monitors to begin transmission of monitored data. Power monitor 70b may, if desired, receive data from the magnetron tube at different rates or duty cycles depending on manufacturing selection or design of the magnetron tube and/or the power monitor 70b.

Data emulator mechanism 30e is operationally connected to and receives encoded instructions from controller 70a. Data emulator 30e transforms those encoded instructions into suitable data for controller 10c. An example of data emulator would be a plurality or bank of operationally connected CD 5053 or CD 4051 devices. The output of data emulator 30e is connected to data output buffer 30c. The output of mechanism 30c is connected to controller 10c. The second embodiment of the interpretive BIOS machine 70 is completely buffered from host microwave oven 10 and is transparent to the user of host microwave oven 10. This buffering allows host microwave oven 10 to operate utilizing the present invention or to operate in the native mode, i.e., receiving data inputs directly from the user.

The Work Manager 70c receives power monitor 70b data structure and BIOS machine 70 data structure via controller 70a. BIOS machine 70 data structure delineates the work requirements to be performed on a specimen disposed within the confines of microwave oven 10. The work requirements were entered into microwave oven 10 by a user in the form of predetermined code 20. The work requirements of the specimen may if desired, be transparent to the user. The user simply extracts the predetermined code 20 from a specimen and enters predetermined code 20 into microwave oven 10. The Work Manager 70c processes the BIOS machine 70's data structure and the power monitor 70b's data structure. The processing of the data structures transforms them into command functions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

Figure 13:
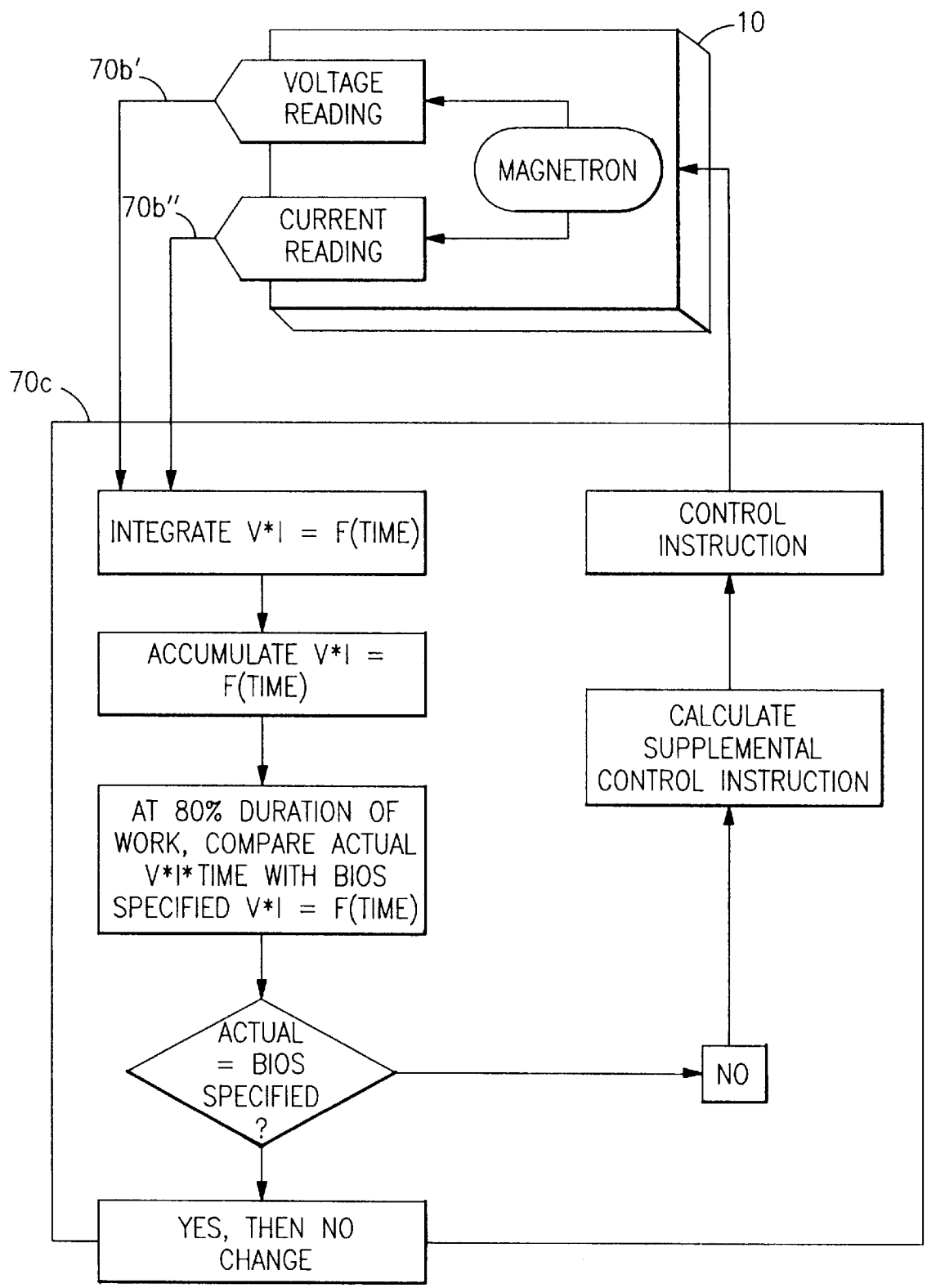
FIG. 13 illustrates the Work Manager of FIG. 12.
Figure 14:
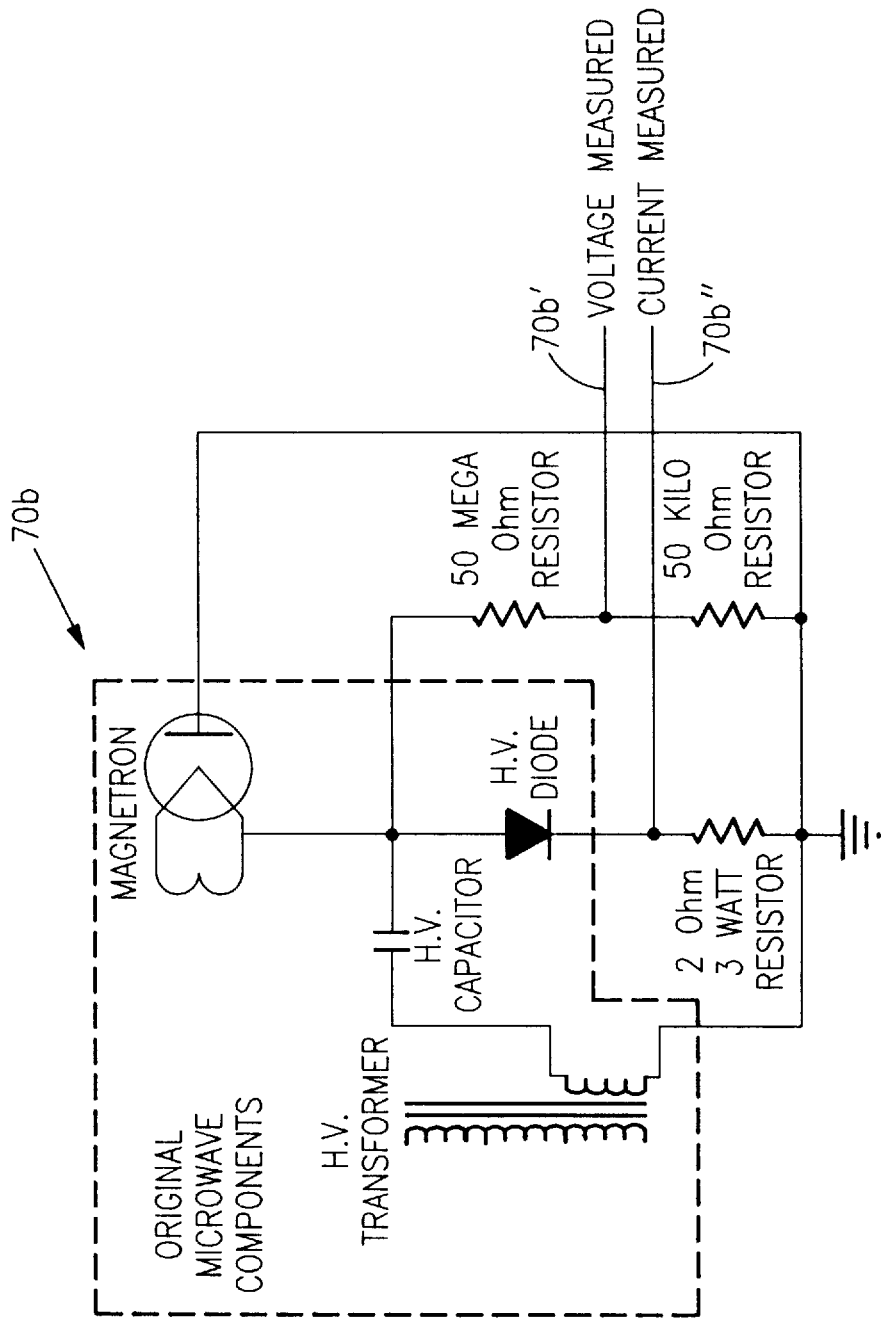
FIG. 14 illustrates a typical electrical circuit for monitoring power of FIG. 13.

A typical example of the operation of the power monitor 70b is illustrated in FIG. 13. A voltage 70b' signal and a current 70b" signal are received from magnetron tube of host microwave oven 10. The format and transmission of the signals may, if desired, be any convenient method known to those skilled in the art. In this particular example an electronic circuit, FIG. 14, delineating the inner functionality of the power monitor is provided.

Work manager 70c, FIG. 13, receives signals 70b' and 70b' and integrates them with respect to time thereby producing a plurality of selected work functions. Those work functions are accumulated at a selected rate to determine the actual work performed by the magnetron tube of microwave oven 10. The Work Manager 70c has received the suggested maximum time and power (work function) duration for BIOS machine 70. At 90% of the suggested work duration the accumulated work function is compared to the actual work performed on the specimen contained within microwave oven 10. If there is a true comparison (yes) no change is made to the work instructions provide to BIOS machine 70. If there is a false (no) result to the comparison a supplemental work function is derived. This supplemental work function adds or subtracts work from the suggested work function provided by BIOS machine 70. A control function is generated containing the adjusted work function. This control function is transmitted to the magnetron tube of microwave oven 10 wherein microwave oven 10 adjusts the work performed by its magnetron tube. This may, if desired, be a repeated process performed at any selected interval or duration. The duty cycle of microwave oven 10 may be mirrored by this process or timed in conjunction with any duty cycle of any microwave oven known in the art.

Figure 16:
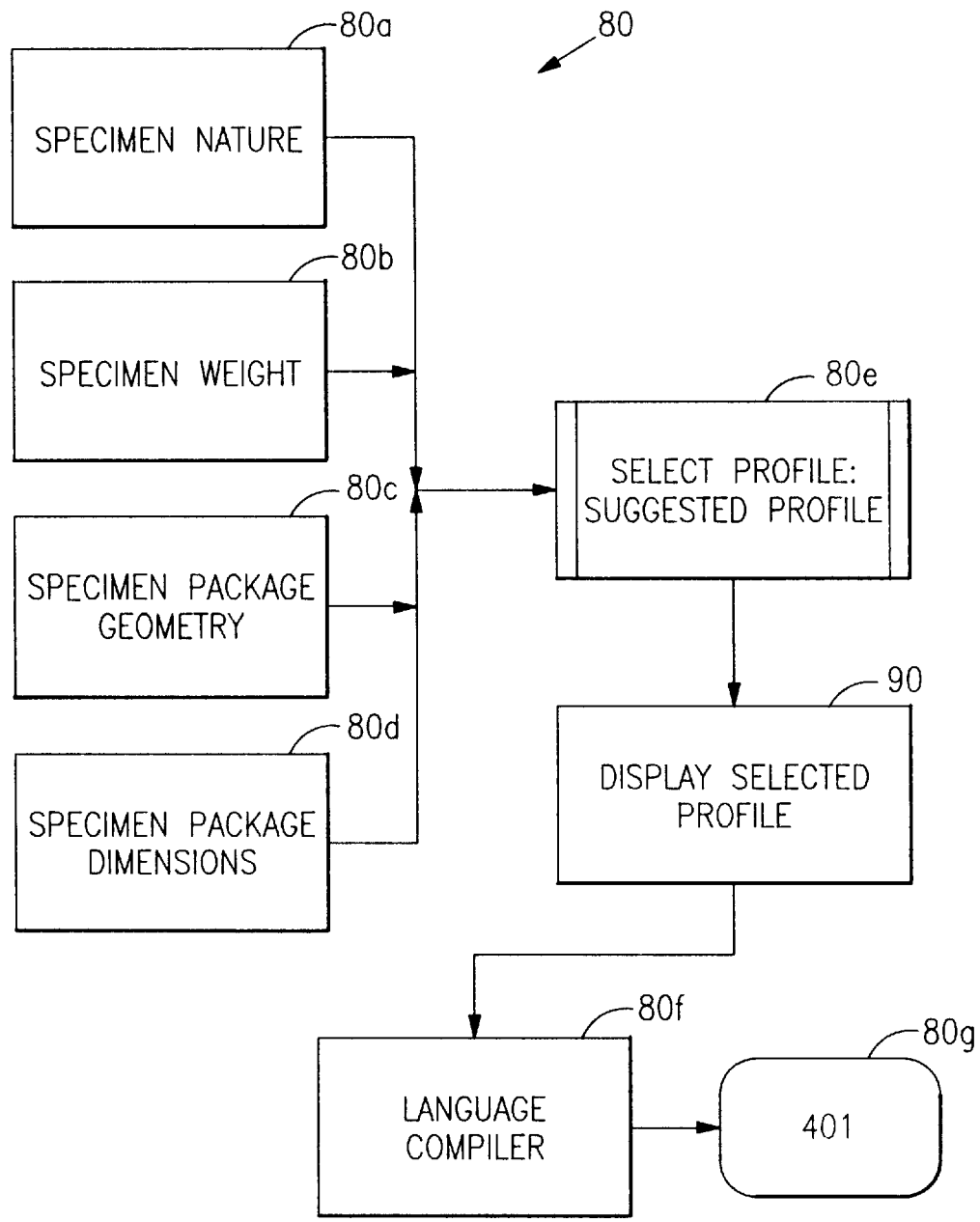
FIG. 16 illustrates a block diagram of a Code Maker a third embodiment of an interpretive BIOS machine.

A third embodiment of the present invention is a Code Maker tool generally illustrated as a block diagram at 80, FIG. 16. Code Maker tool 80 provides the manufacturer of the specimen a convenient method to implement a predetermined code that may, if desired, be affixed to the specimen in any convenient manner known in the art. The specimen may, if desired, be represented as a plurality of unique descriptors that delineate unique characteristic of the specimen. Examples of some of those descriptors are type 80a, weight 80b, packing geometry 80c, and package dimensions. These are transmitted to and received by the Code Maker 80. Code maker 80 correlates these descriptors into a selected profile 80e that is displayed on a typical computer screen tool 90, FIG. 15. The profile 80e provides all of the selected information and a suggested profile based on a history of all the aforementioned descriptors. Profile 80e is displayed on screen tool 90 for the convenience of the user. A language 80f is provided that has as its syntax all of the descriptors entered by the user and suggested by the Code Maker 80. The language expresses a computed symbol 80g that encapsulates all aforementioned descriptors. The symbol may, if desired, be any length, configuration, geometry, or symbol. A typical example of that symbol 80g comprises the digits 4-0-1.

Figure 17:
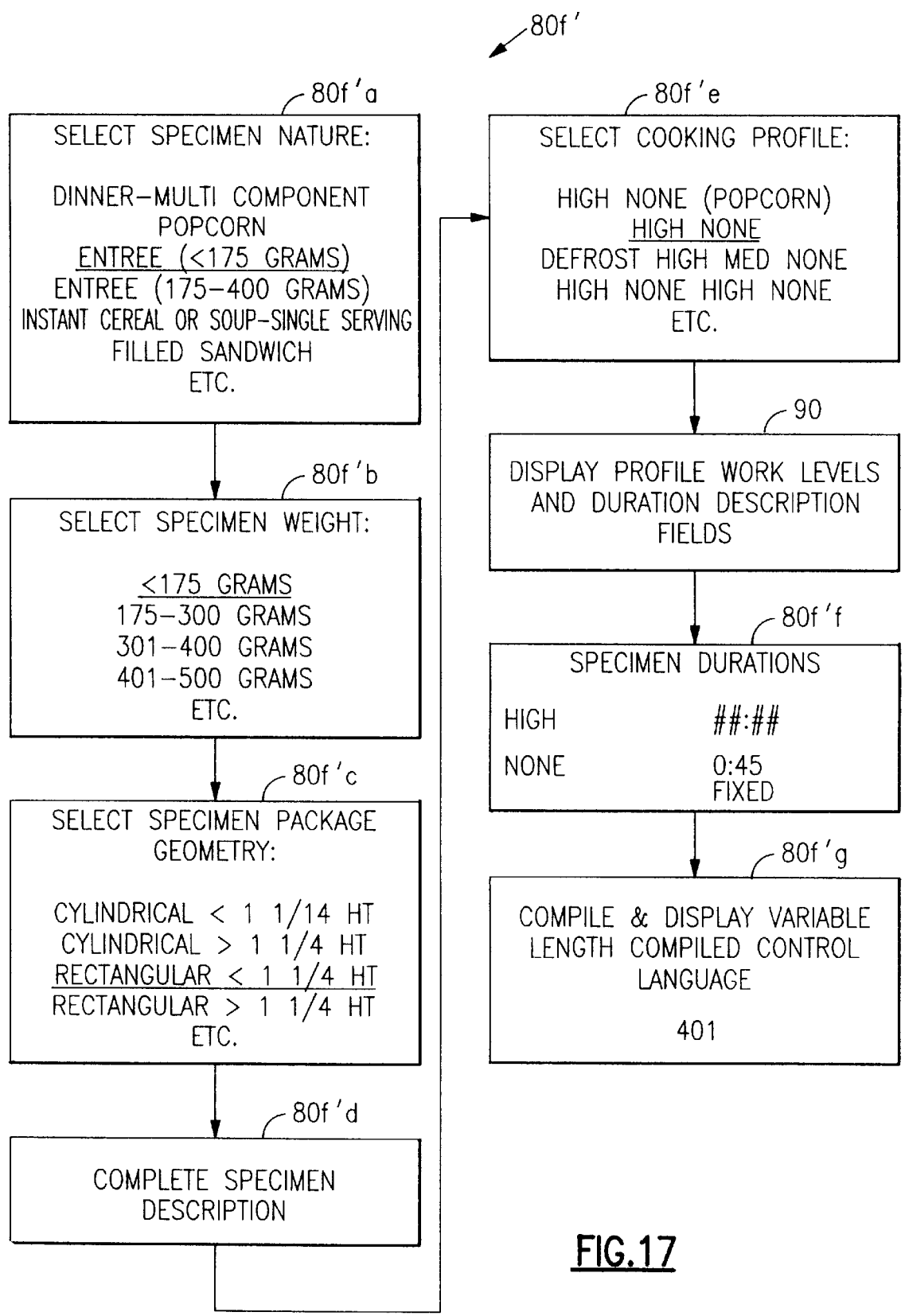
FIG. 17 illustrates an operational block diagram for predetermining a code.
Figure 18:
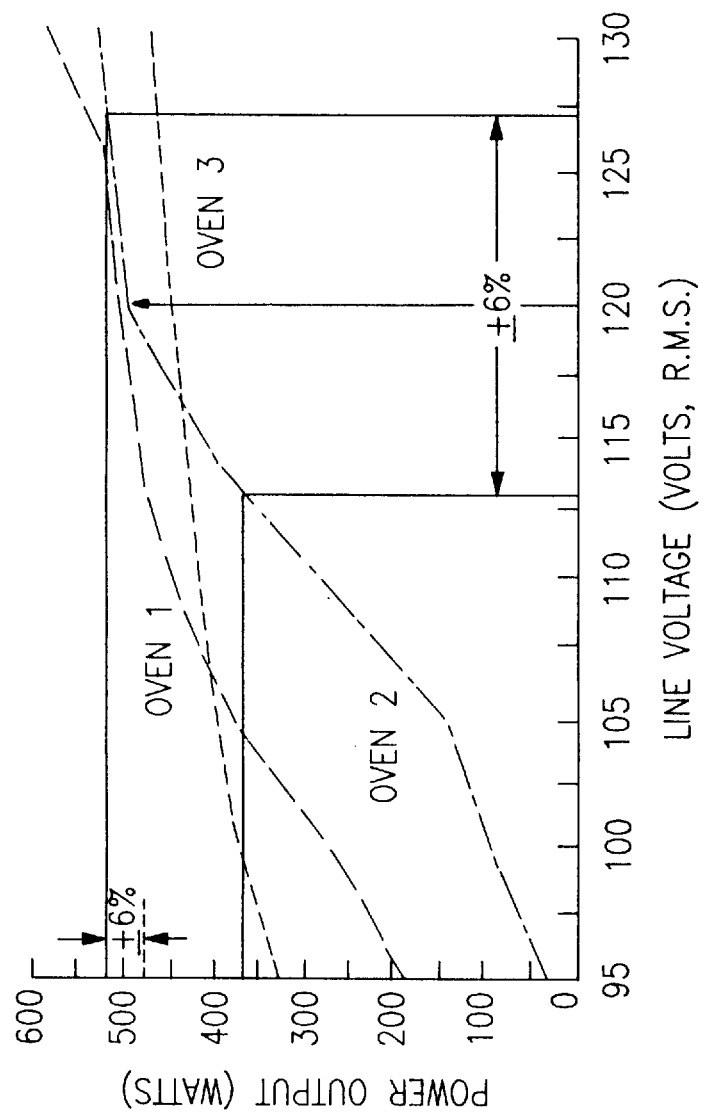
FIG. 18 illustrates line voltage versus power output to a microwave oven.

The code grammar that provides the metes and bounds for language 80f may comprise any format that enables descriptors, provided by a user, to be transformed into a symbol or symbols that are affixed to a specimen. An example of the code grammar that may, if desired, be used in conjunction with screen tool 90 is generally illustrated at 80f', FIG. 17. An entree 80f 'a, with a weight of less then 175 grams, 80f 'b, is selected. The cooking profile 80f 'e is selected to be 'high none'. This profile is first selected and then displayed on screen tool 90. The specimen 80f 'f work duration is derived and displayed on screen tool 90 as symbol 401 80f 'g.

A preferred mode of operation of the present invention is to provide controller 30b with a memory containing an embedded interpretive BIOS machine 30. Controller 30b is operatively disposed within microwave oven 10. Microwave oven 10 provides a data entry mechanism 10a that is operatively connected to oven 10 and controller 30b. The data entry mechanism 10a receives data from the user of microwave oven 10 and then transmits that data to the interpretive BIOS machine 30. Interpretive BIOS machine 30 selects a mode of operation from the received data. Interpretive BIOS machine 30 then validates the selected mode of operation, interprets the received data into time duration and power level data, converts the time duration and power level data to selected BIOS power level(s) and power level time duration(s). The resulting process control instruction set, through a series of scalars, is then scaled to the host oven or host process. Interpretive BIOS machine 30 then transmits the interpreted and scaled data to the microwave oven 10 whereupon the microwave oven operates as per BIOS interpreted and scaled time duration(s) and power level(s).

A preferred mode of operation of the second embodiment of the present invention is to provide controller 70a with a memory containing an embedded interpretive BIOS machine 70. Controller 70a is operatively disposed within microwave oven 10. Microwave oven 10 provides a data entry mechanism 10a that is operatively connected to oven 10 and controller 70a. The data entry mechanism 10a receives the work requirements from the user of microwave oven 10 and then transmits those requirements to the interpretive BIOS machine 70. The Work Manager 70c disposed within and in communication with BIOS machine 70 receives signals from power monitor 70b. The Work Manager 70c interprets the work requirements received from BIOS machine 70 and the signals received from Power Monitor 70b. The Work Manager 70c processes the BIOS machine 70's work requirements and the power monitor 70b's signals. The processing transforms the interpreted signals and requirements into command functions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

A preferred mode of operation of the third embodiment of the present invention is to provide a Code Maker tool 80 that provides the manufacturer of the specimen a convenient method to implement a predetermined code that may, if desired, be affixed to the specimen in any convenient manner known in the art. The specimen may, if desired, be represented as a plurality of unique descriptors that delineate unique characteristic of the specimen. Code maker 80 correlates these descriptors into a selected profile 80e that represents the work requirements of the specimen. The descriptors are formulated into a convenient arrangement of numbers or other symbols governed by the code grammar rules. That number or symbol (predetermined code) is then affixed to the specimen.

The data entry mechanism 10a receives predetermined code from the user of microwave oven 10 and then transmits that predetermined code to the interpretive BIOS machine 70. The Work Manager 70c in communication with the BIOS machine 70 receives signals from power monitor 70b. The Work Manager 70c interprets the work requirements received from BIOS machine 70 and the signals received from Power Monitor 70b. The Work Manager 70c process the BIOS machine 70's work requirements and the power monitor 70b's signals. The processing transforms the interpreted signals and requirements into command functions that contain data representing work expended on the specimen or work to be expended on the specimen. Controller 70a generates an instruction set comprising in part the command function provided by Work Manager 70c. Controller 70c then transmits this instruction set to microwave oven 10 to enable the proper work to be performed on the specimen.

The present invention may, if desired, be programmed in any suitable programming language known to those skill in the art. An example of that programming language is disclosed in *C Programming Language*, 2/e, Kernighan & Richtie, Prentice Hall, (1989).

While the present invention has been described specifically with respect to microwaves being the energy source employed, it is to be understood that other energy sources along the electromagnetic radiation spectrum can be employed by modifying or using different ovens or housings. For example, ultraviolet, laser light, infrared, alpha, beta, gamma, or x-ray radiation, or combinations thereof, can be employed. It would be a matter of developing specific profiles for the items to be "processed" by the radiation. Such items are not limited to food, but may also include, but are not limited to, painted articles where the paint is to be cured by infrared or UV light, coatings which may be cured by UV light, polymerization by UV light, irradiation of objects by radioactive energy beams, cutting, warming or melting of objects by infrared or laser light, and the like. In essence, wherever energy is to be directed at an article and a multi-step or multi-phase sequence of operations is to occur (or a single step or phase) and a profile of radiation application can be developed, the present invention can be used to permit such profile to be entered into a BIOS or machine which will accept and convert the data into operational signals which control, via a microprocessor or similar controller, the actuation, direction and characteristics of the energy source with respect to the article to be processed. In place of the excitation of water molecules, the respective energy processing properties can be determined with reasonable predictability to develop standard codes for processing standard items. Such items can then be predictably and repeatably processed to reduce random variation in result and improve quality control and quality assurance.

Therefore, while the present invention has been described with respect to food and microwaves, the description is intended to encompass the above mentioned variations and alternatives. Although the specific mechanisms for each radioactive source and article to be processed are not described, it would be obvious to those skilled in the respective art to be able to standardize profiles with minimal experimentation and to modify the hardware described herein to accommodate a different energy source, with concomitant protective and safety features considered.

While the present invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

We claim:

1. A work manager for a microwave oven, said microwave oven receiving a predetermined code derived externally therefrom, comprising:

a specimen requiring work performed thereon disposed within the microwave oven;

a controller disposed within the microwave oven, said controller having a memory and a sensor for detecting power consumed by the microwave oven, said sensor being connectively disposed upstream from the generation of microwave energy by the microwave oven;

a program operatively disposed in said memory;

said program receiving data disposed in said predetermined code defining work requirements of said specimen;

said program receiving power data from said sensor;

said program processing said work requirements and said power data; and, an instruction set generated by said program, said instruction set operatively commanding the microwave oven, whereby work performed on said specimen remains independent of power consumed by the microwave oven.

2. A work manager for a microwave oven, the microwave oven having a cavity disposed therein, the cavity sized to receive a specimen intended for work to be performed thereon, at least one power sensor connectively disposed upstream from the generation of microwave energy by the microwave oven for detecting power supplied to the microwave oven, comprising:

a predetermined code, derived externally from the work manager, said predetermined code extracted from the specimen and entered into the microwave oven;

an interpretive BIOS machine operatively disposed within the microwave oven, said BIOS machine receiving said predetermined code;

said BIOS machine receiving power data from the power sensor;

processing said power data and said predetermined code by said BIOS machine;

an instruction set generated by said BIOS machine, said instruction set transforming said power data and said predetermined code into commands for work to be performed on the specimen by the microwave oven, whereby the specimen receives required work independent of power supplied to the microwave oven.

3. A work manager as recited in claim 2, wherein said predetermined code delineates a work characteristic particular to said specimen.

4. A work manager as recited in claim 3, wherein said characteristic is selected from a group consisting of the mass of said specimen, the dimensional and geometric characteristics of said specimen, and the material composition of said specimen.

5. A work manager as recited claim 4, wherein said specimen composition, geometric, dimension, and mass bearing code is transmitted to the BIOS machine, said BIOS machine interprets said specimen composition, geometric, dimensional, and mass bearing code.

6. A power manger as recited in claim 5, wherein said BIOS machine interactively comprises at least one microprocessor, at least one memory, at least one power sensor operatively connected to the microwave oven, said sensor periodically transmits selected power data to the BIOS machine for processing.

7. A work manager as recited in claim 6, wherein said power data is selected from the group consisting of voltage, current, work, time, power factor, peak voltage, and peak current.

8. A work manager as recited in claim 7, wherein said power data is inclusive of the phase relationship between said group members.

9. A work manager as recited in claim 8, wherein said specimen is an organic material having a defined mass.

10. A work manager as recited in claim 9, wherein said specimen is an inorganic material having a defined mass.

11. A work manager as recited in claim 10, wherein said material is a food group.

12. A work manager as recited in claim 2, wherein said predetermined code comprises a profile indicative of the work to be performed on said specimen.

13. A work manager as recited in claim 12, wherein said profile is selected from a group consisting of altitude, atmospheric pressure, time, geometry, power, specimen dimensions and geometric shape, specimen mass, and specimen material composition.

14. A work manager as recited in claim 13, wherein said predetermined code comprises at least one symbol.

15. A work manager for a microwave oven, comprising:

a specimen contained within the microwave oven, said specimen having work performed thereon by the microwave oven;

a controller operatively disposed within said microwave oven, said controller having a memory and at least one power sensor connectively disposed upstream from the generation of microwave energy by the microwave oven;

said sensor periodically transmitting power data to said controller;

a program operatively stored in said memory of said controller;

a predetermined code derived externally from the microwave oven, said predetermined code extracted from said specimen and entered into said microwave oven;

said code having a data function delineating said specimen's characteristic dimensional geometry, food group, composition, and mass;

said controller operatively receiving said data function from said microwave oven;

said program processing said power data and said data function;

said program transforming said processed data into at least one command function; and, an instruction set generated by said controller, said instruction set containing said function command;

said instruction set, implemented by said controller, commands and controls the power generated by the microwave oven, whereby said controller commands and controls the work performed on said specimen independent of power supplied to said microwave oven.

\* \* \* \* \*